United States Patent [19]

Stipanovich et al.

[11] Patent Number: 5,117,353

[45] Date of Patent: May 26, 1992

[54] SYSTEM FOR USE IN A TEMPORARY HELP BUSINESS

[75] Inventors: Joseph Stipanovich; Sharon Bredeson, both of Minneapolis, Minn.

[73] Assignee: Staff-Plus, Inc., Minneapolis, Minn.

[21] Appl. No.: 347,828

[22] Filed: May 5, 1989

[51] Int. Cl.$^5$ ............................................. G06F 15/21
[52] U.S. Cl. ..................................... 374/401; 364/406
[58] Field of Search ........................ 364/401, 403, 406

[56] References Cited

U.S. PATENT DOCUMENTS 4,937,743  6/1990  Rassman et al. ..................... 364/401

OTHER PUBLICATIONS

Data Sources Directory of Software, vol. 8, No. 2, 1st edition, 1989, pp. J-280-281.
Datapro Directory of Software, 1989, pp. D75-200-001 to D75-200-008.
Applicant Management System, Integral, CA, First Installed 1972.
Advertisement referring to "Data Force" of Atlanta, Georgia, appearing in Contemporary Times, vol. 8, Issue 27, Spring 1989.
Advertisement referring to "Qwiz Power" of Atlanta, Georgia, appearing in Contemporary Times, vol. 8, Issue 27, Spring 1989.
Advertisement referring to "Caldwell-Spartin" of Marietta, Georgia, appearing in Contemporary Times, vol. 8, Issue 27, Spring 1989.
Advertisement referring to "SkillTrack" of San Francisco, California, appearing in Contemporary Times, vol. 8, Issue 27 Spring 1989.
Advertisement referring to "Hirelink" of Pittsford, New York, appearing in Contemporary Times, vol. 8, Issue 27, Spring 1989.
Advertisement referring to "PRS" of Irvine, California, appearing in Contemporary Times, vol. 8, Issue 27, Spring 1989.
Advertisement referring to "WordPro" of Rockville, Maryland, appearing in Contemporary Times, vol. 8, Issue 27, Spring 1989.
Advertisement referring to "PSSC" of Williamsville, New York, appearing in Contemporary Times, vol. 8, Issue 27, Spring 1989.
Advertisement referring to "SkilMatch" of Houston, Texas, appearing in Contemporary Times, vol. 8, Issue 27, Spring 1989.

*Primary Examiner*—Jerry Smith
*Assistant Examiner*—Russell Cass
*Attorney, Agent, or Firm*—Merchant, Gould, Smith, Edell, Welter & Schmidt

[57] ABSTRACT

Application of computing equipment to temporary help businesses, particularly for scheduling personnel suited to particular tasks for work on a temporary basis. Temporary help applicants are screened and their particular skills matched to client job orders, allowing clients to access the system directly. The system monitors jobs in progress, schedules work, and trains temporary help workers. The system also allows for "stacking jobs" to provide an incentive to temporary help workers to remain employed by a single temporary help business.

14 Claims, 17 Drawing Sheets

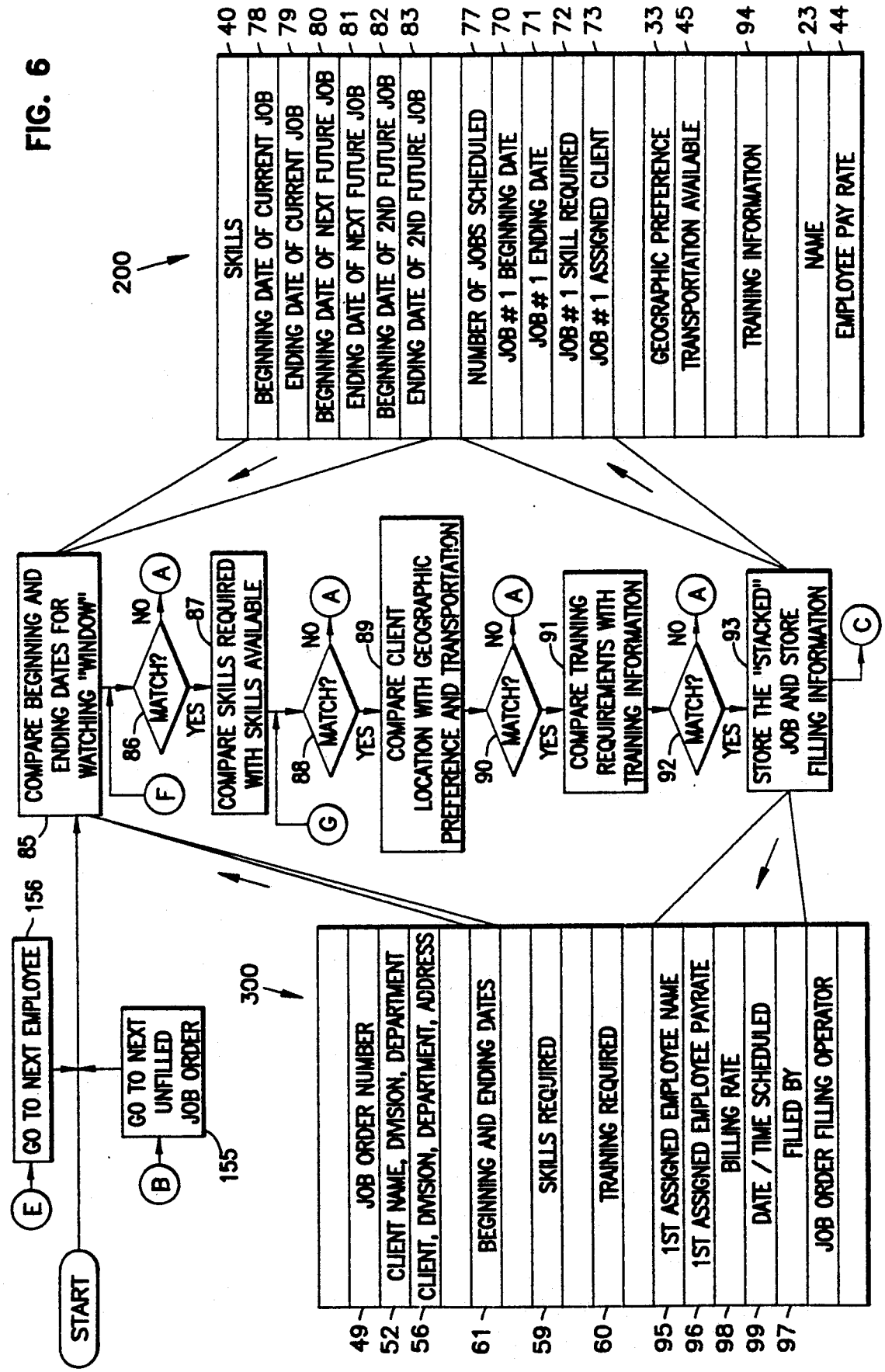

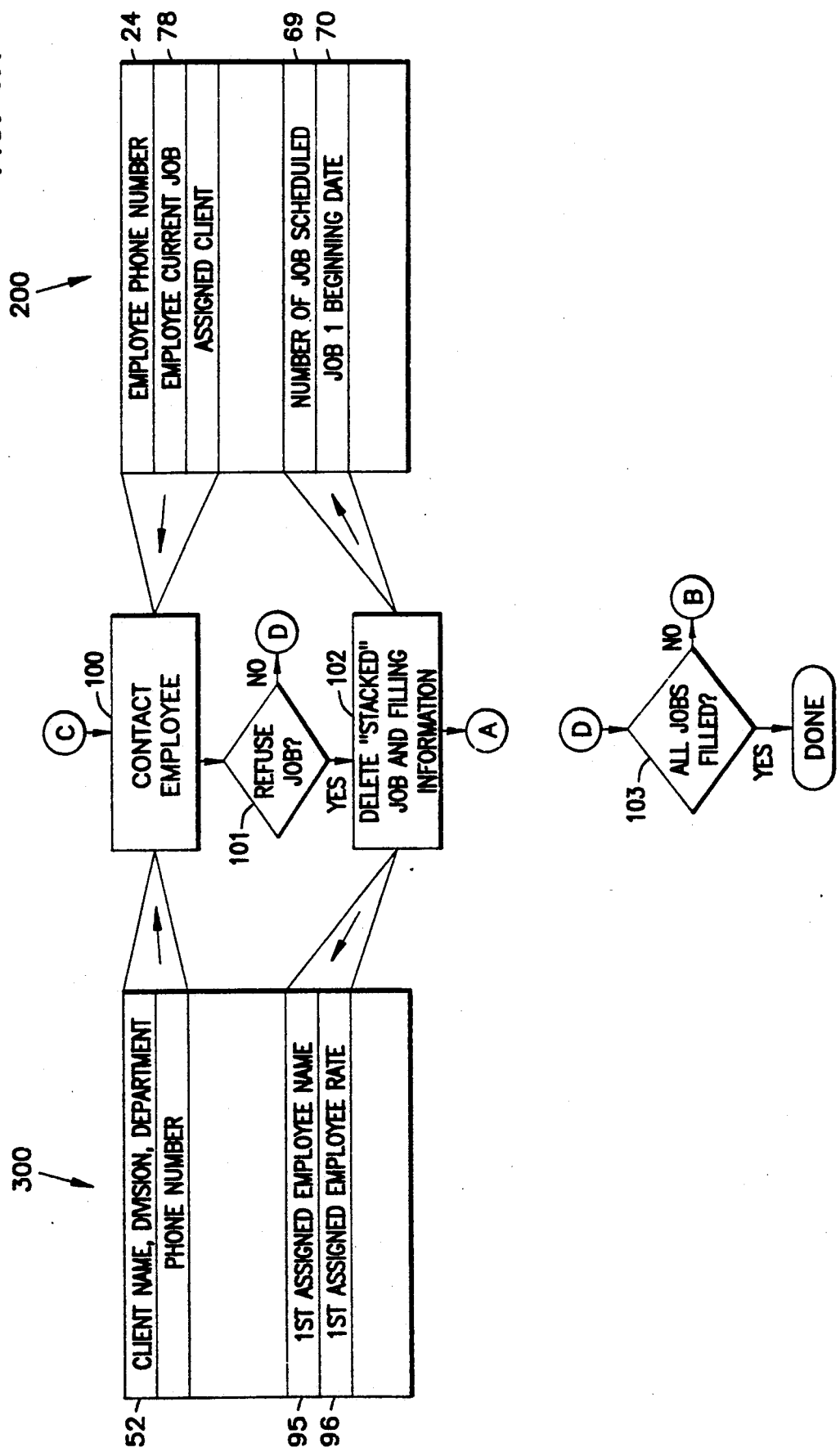

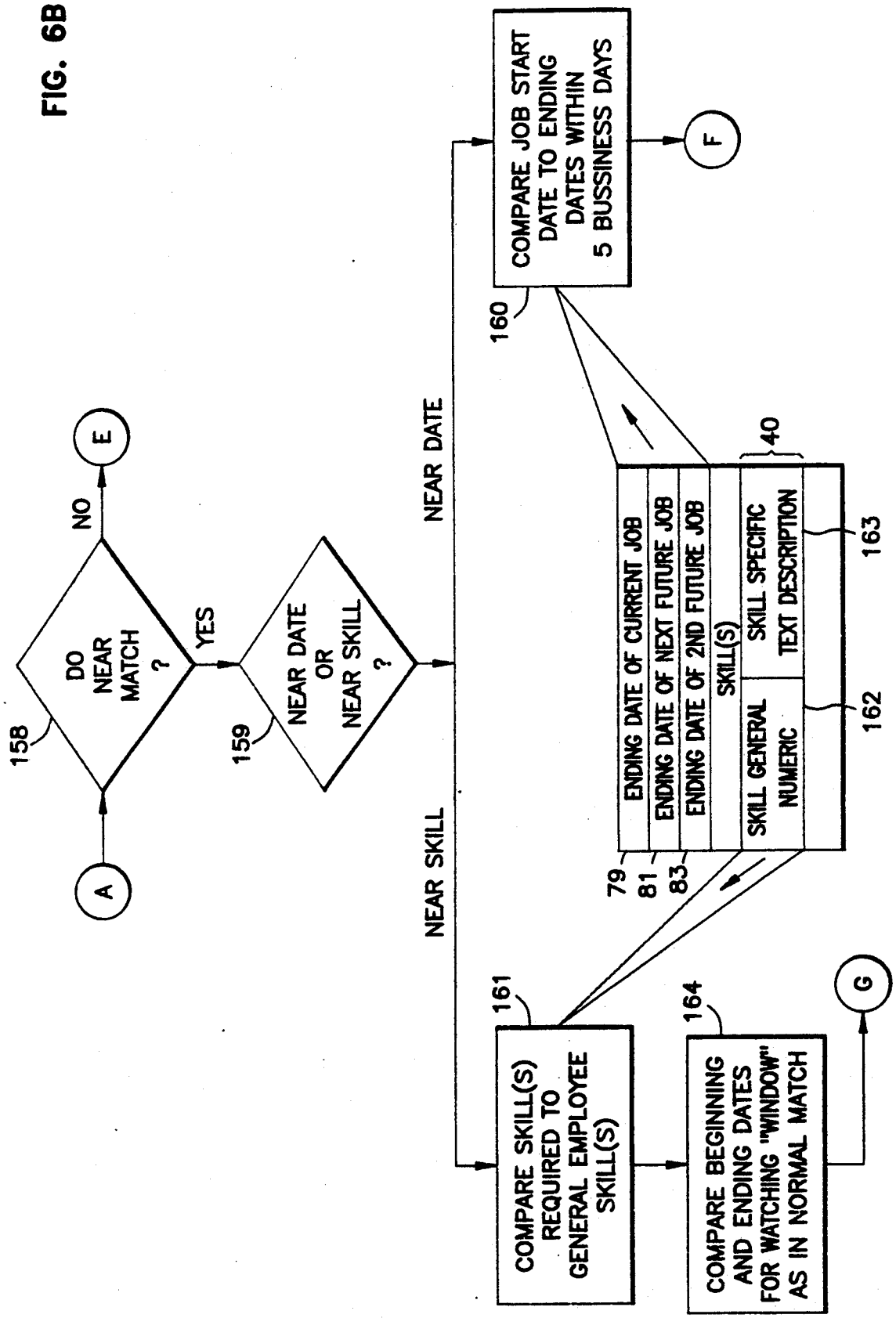

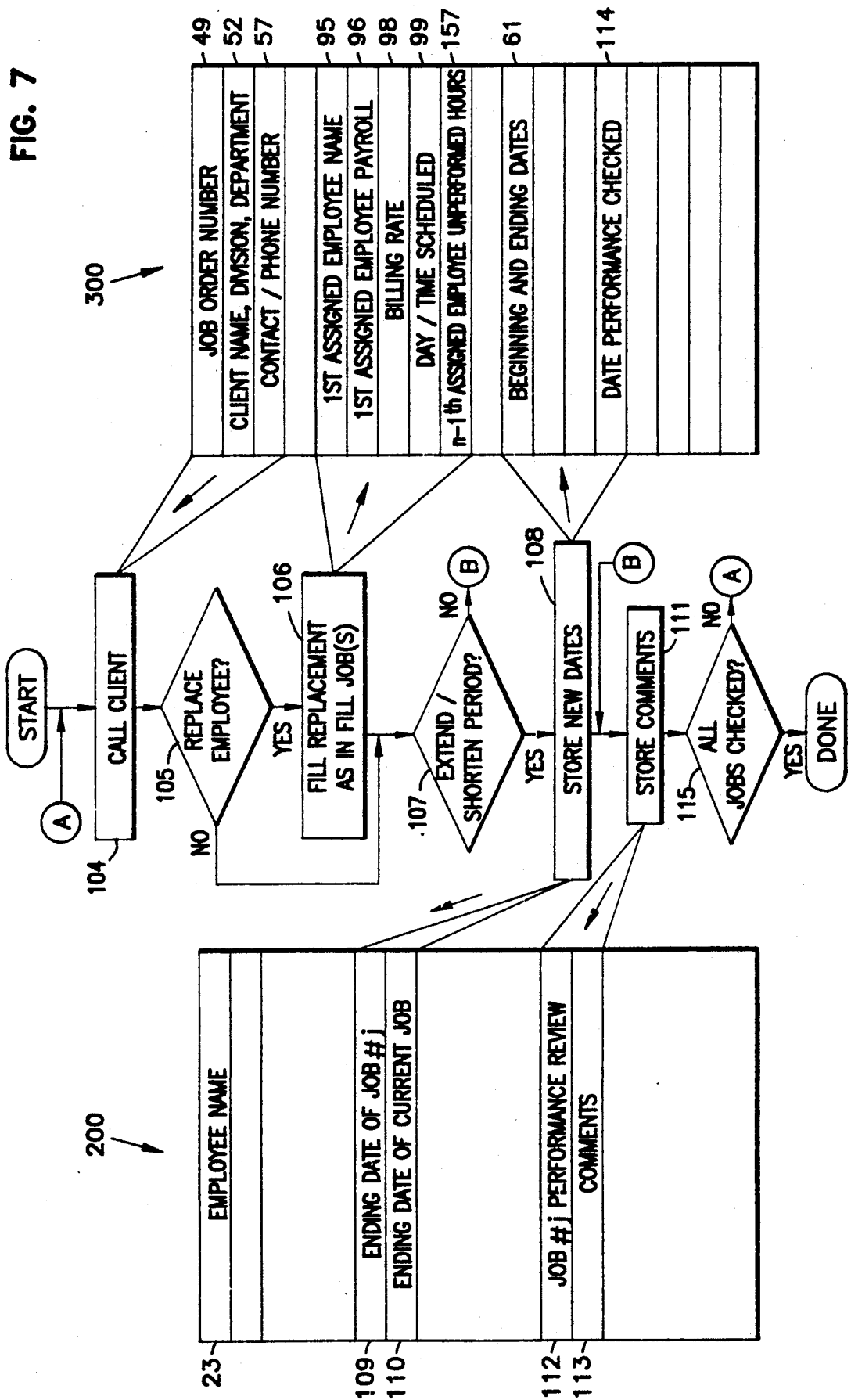

SYSTEM FOR USE IN A TEMPORARY HELP BUSINESS

TECHNICAL FIELD OF THE INVENTION

The present invention pertains to the field of digital computing equipment, and particularly to the application of computing equipment to temporary help businesses.

BACKGROUND OF THE INVENTION

Temporary help businesses schedule personnel suited to particular tasks for work on a temporary basis. They screen temporary help applicants, match their particular skills to client job orders, and monitor jobs in progress. At the same time, they take and fill client job orders. As the need for temporary help expands, temporary help employees expect uninterrupted work at a series of jobs. This is known in the art as "stacking jobs." Scheduling work, training, and "stacking jobs" provides incentive to temporary help workers to remain employed by a single temporary help business. Scheduling temporary workers with suitable talents quickly and economically satisfies clients. Serving temporary employees and clients is a goal of temporary help businesses and an object of the present invention.

Temporary help businesses use several techniques to manage their operations. Some keep paper records of all employees and transactions. Some use paper records and digital computers in combination. For example, an applicant requesting temporary work assignments might complete a paper record of personal data, and take computerized tests to assess specific skills. Most temporary help businesses use some form of computerized accounting.

Typically, these various paper and computerized operations management systems are not integrated within the temporary help business. These systems often do not facilitate matching employees to jobs by inexact criteria such as near dates or near skills. Some systems do not facilitate "stacking jobs." Principally, these systems do not permit automated communication between buyers and sellers of temporary help services. This results in duplication of manual input, decrease in responsiveness, and increased data entry errors.

An advanced example of a computerized system is the System for Monitoring Temporary Help Usage in a Multi-Vendor Environment, disclosed hereinbelow, by Stipanovich, co-inventor of the present invention. This system provides temporary help scheduling for a narrow group of temporary help businesses: internal temporary help departments of large corporations. This system is based on cost-tracking, and monitors scheduling of both an internal pool of temporary help workers, and workers scheduled by outside vendors. Like the present invention, the system schedules temporary employees based on availability and skills. Unlike the present invention, the prior system:
1. minimizes expenditures for temporary help,
2. tracks temporary help provided by multiple vendors,
3. is primarily an accounting and mainframe interface system, and
4. does not provide "stacking" of temporary jobs.
Other systems known in the art provide similar, but more limited functionality.

SUMMARY OF THE INVENTION

The present invention is a software system operable on a digital computer for use in a temporary help business for screening temporary help employee applicants, testing their skills, and receiving and recording job orders from one or more clients of the temporary help business. The software then matches employees to job orders, monitors employee performance, determines their pay and prints payroll checks, determines an amount due from each client and prints invoices, and reports on the operation of the temporary help business. The software, at user activation, can perform "near" matches, wherein employees are matched to job if they are likely to suitable to a job or can be made available by rescheduling for a job. The software permits "stacking jobs," wherein more than one future job can be scheduled for any employee. Also, the system can communicate electronically under software control to receive job orders from clients, and transmit billing information on jobs performed to clients.

BRIEF DESCRIPTION OF THE DRAWINGS

FIG. 6, FIG. 6a and FIG. 6b together form a detailed block diagram of software component functions for filling job orders based on the Employee Inventory File.

FIG. 7 is a detailed block diagram of software component functions for monitoring jobs-in-progress.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. This embodiment is described in sufficient detail to enable those skilled in the art to practice the invention and it is to be understood that other embodiments may be utilized, and that structural changes may be made without departing from the scope of the present invention. The following detailed description is, therefore, not to be taken in a limited sense, and the scope of the present invention is defined by the appended claims.

Figure 1:
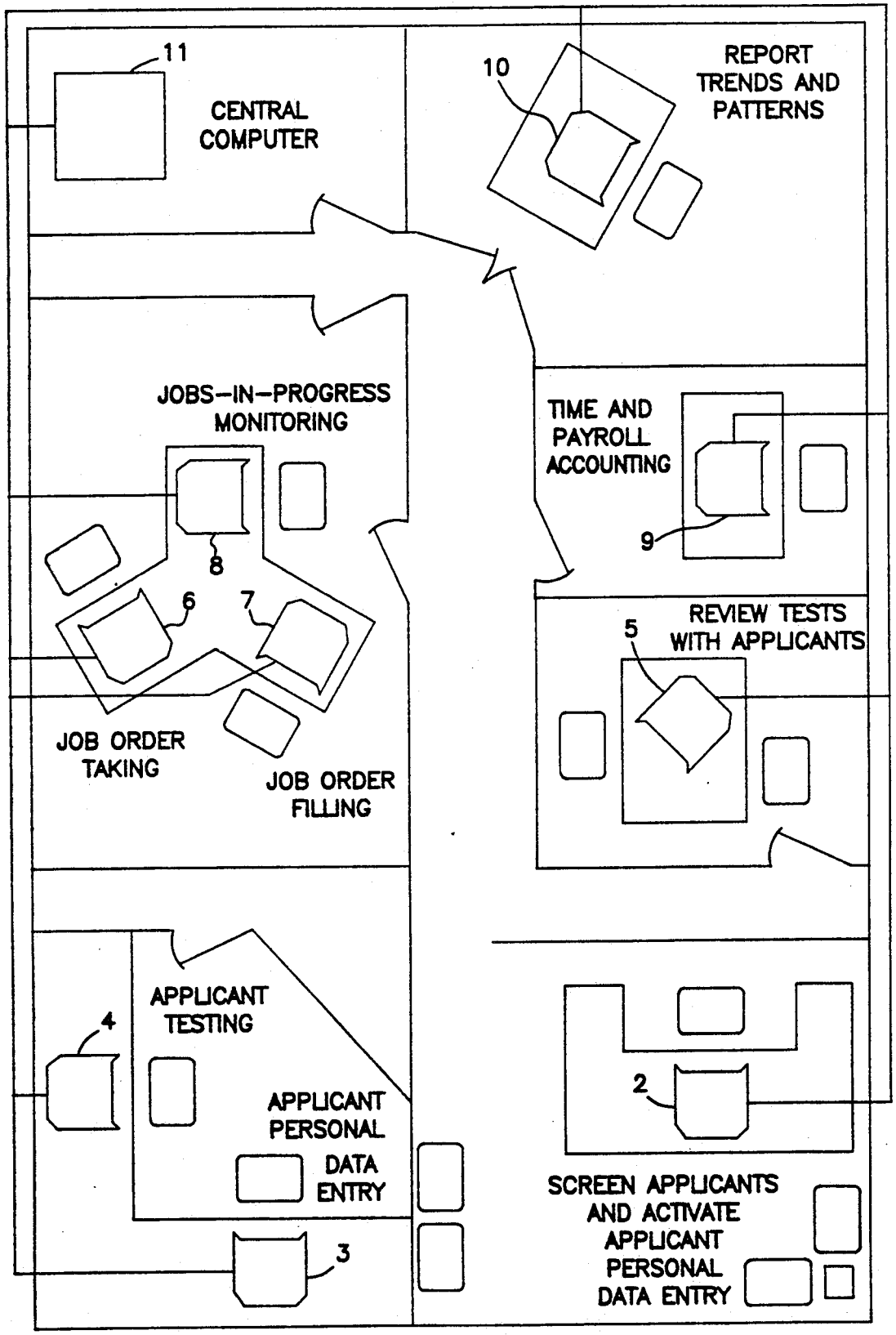
FIG. 1 is a floor plan diagram illustrating the layout of computer equipment in a temporary help business.

FIG. 1 shows a floor plan illustrating the layout of computer equipment in a temporary help business according to the system of the present invention. The Temporary Help Business 1 is organized by area of work responsibility. An Applicant Screening work-station 2 is provided, and operated by a receptionist who answers calls from individuals seeking employment with the temporary help business. Each applicant is pre-screened at the Applicant Screening work-station 2. If it is determined that the applicant is suited to work for the temporary help business, the applicant is asked to come in and submit an application for employment.

When the applicant arrives to submit an application, the receptionist activates a work-station used to enter personal data about the applicant through the Applicant Screening work-station 2. Activation is initiated by an input response to a system prompt on the Applicant Screening workstation 2, which causes the Applicant Data Entry work-station 3 to display the applicant's name in character form, prompt the applicant for an initial response indicating the applicant is ready, and enable an attached keyboard to accept applicant input. After entering personal data commonly found on a job application, the applicant is tested for skills. Testing occurs on a Testing work-station 4. At the completion of testing, a reviewer reviews the employee skills tests with the applicant at a Review work-station 5. Through this workstation, a minimum pay rate is entered for the applicant. Additionally, any errors in the application are corrected through this work-station. The Review work-station 5 may be used at any time to update or modify any information about temporary help employees on the system.

Job orders from a client of the temporary help business are taken by telephone. When a client telephones the temporary help business with an order, an operator enters that order onto the system through a Job Order Taking work-station 6. All pertinent information about the temporary help position that a temporary employee is sought for is recorded on the system. Next, an operator activates a Job Order Filling work-station 7, and searches for all temporary help employees whose skills and availability match the job order. The displayed employees are contacted manually by phone, and asked if they would accept the position. When a temporary help employee accepts a position, the client is notified by phone that a match has been made. The client is also informed of a billing rate which is also entered into the system through the Job Order Filling work-station. After the employee begins performing the temporary job, the client is contacted manually by an operator of a Job-In-Progress work-station 8. On this work-station, the operator can display information about the job, and the employee filling it. The client is asked whether they have any comments regarding the employee's service. They are also asked if the term of the temporary job is to be extended or abbreviated, or whether the employee should be replaced. This information is entered into the system through the Jobs-In-Progress work-station 8.

Accounting is performed for specified accounting periods. At the conclusion of each accounting period, invoices are generated for clients based on employee time records which are submitted by temporary help employees to the temporary help business. An operator of a Time and Payroll Accounting work-station 9, can cause the system to print out reports of all time and job information for each accounting period. The operator of the Time and Payroll Accounting work-station 9, can then modify and correct any errors in the information retained by the system. When the employee time records and the data in the system are in agreement, an operator can cause, through the Time and Payroll Accounting work-station 9, printing of payroll checks for the employees, and invoices for the clients. Invoices reflect all time worked for the clients during the accounting period. Invoices detail individual jobs performed by employees assigned by the temporary help business to that client.

To remain competitive in the temporary help industry, the business must monitor its own performance. To do this, a Report and Trend Pattern work-station 10, can be used by an operator to specify criteria for reports. The criteria entered through the Report and Trend Pattern work-station 10 can specify clients, skill sets, and pay and billing rate information among other things. Reports based on these criteria reflect the performance of the temporary help business.

The work-stations shown in the preferred embodiment located in the temporary help business 1, are networked to a central computer 11. Individual work-stations described above are dedicated to specific tasks inside the temporary help business. As will be readily apparent to those skilled in the art, this same system could be implemented without departure from the present invention on a system of networked work-stations, multi-purpose work-stations, or other suitable digital computing equipment configurations.

Data maintained by the system is stored on fixed media on a central computer 11. The data is organized in database files on this fixed rotational (disk) storage media. Specifically, the database files are the Employee Inventory File 200 of FIG. 3, the Job Order File 300 of FIG. 4, and the Periodic Time File 400 of FIG. 8. These files are organized into records, and fields within records. As is readily apparent to those skilled in the art, other representations of the data on fixed media, such as "flat" character files on disk, could be employed without departing from the present invention. Further, representations of similar data could be made in electronic storage media (memory), or some combination of the two could be employed without departure from the present invention.

Figure 2:
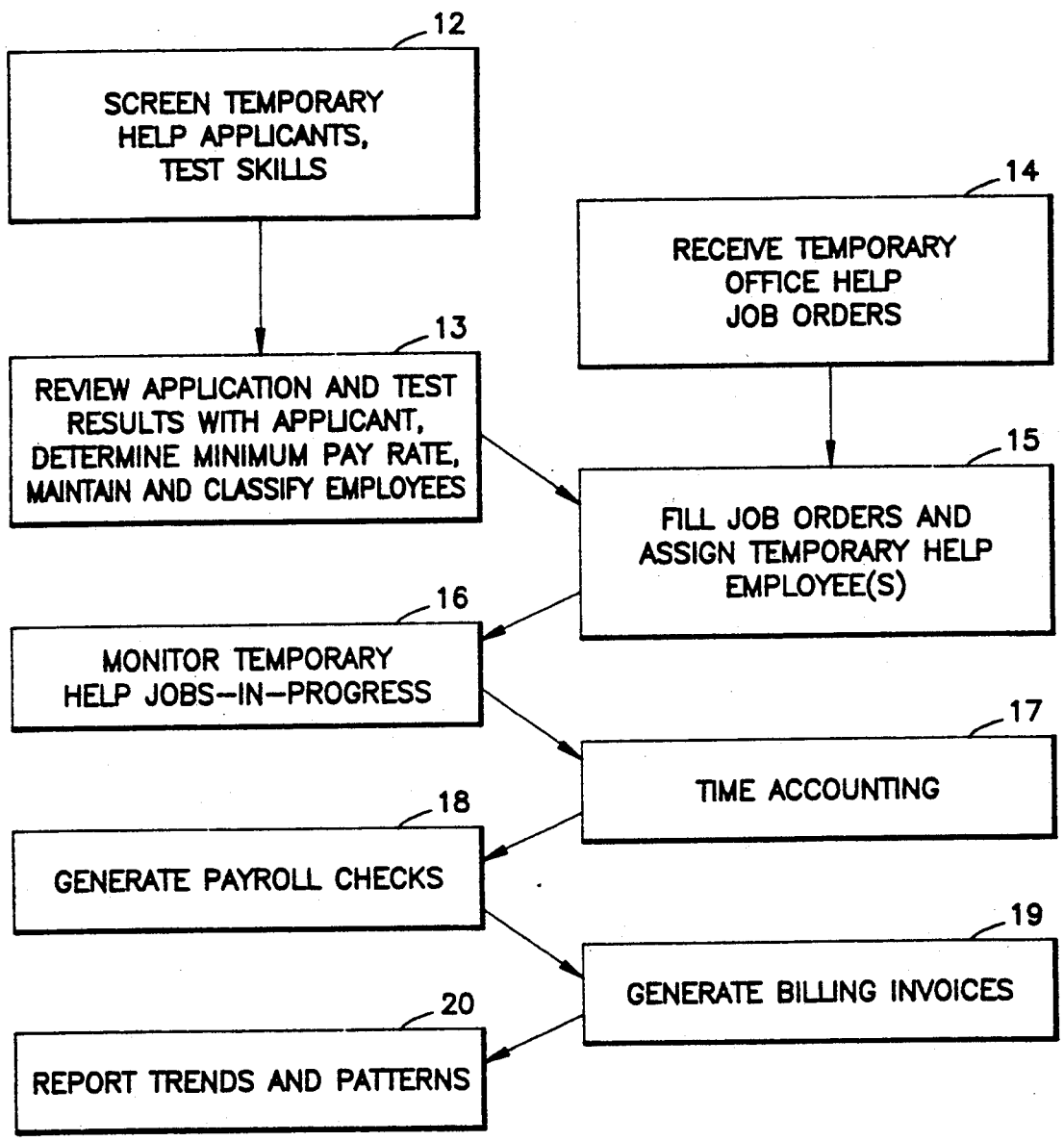
FIG. 2 is a high level block flow diagram of software component functions of a system for use in a temporary help business.

Referring now to FIG. 2, which is a high level block diagram of the functions performed by the computer system generally described in FIG. 1, the flow of information within the system is disclosed. The system is driven by data which is initially entered when temporary help employee applicants are screened. This is represented by function block 12. Also represented in block 12 is the entry of detailed applicant information, and administration of skill tests to the employee. This information is preserved on the system and passed to function block 13. Block 13 represents viewing the test results with the applicant and assigning pay rates to the applicant. This pay rate will be the minimum pay rate accepted by the applicant as a temporary help employee. Also in block 13, detailed information about the applicant is reviewed for accuracy and corrected where necessary.

The clients of the temporary help business submit job orders into the system through function block 14. Block 14 represents entry of all the detailed information specifying a job order. That information is preserved into block 15 which represents the matching of data preserved from block 13 and data preserved from block 14. The system displays a list of successfully matched employees (candidate employees). Candidate employees are all suitable temporary help employees who could perform the temporary help job for each of the job orders. Finally, block 15 represents an employee being assigned to each of the unfilled job orders. Information necessary for confirming the matched job order is displayed for the operator to manually contact the client. When the operator confirms acceptance of the temporary position with the temporary help employee, that the employee is notified of the start, end dates, type of work, and assigned client.

This information is preserved into function block 16 which represents monitoring temporary help jobs-in-progress. A client is manually contacted, and pertinent information is preserved on the system as represented in block 16. All the information gathered to this point is then passed to the accounting system.

Function block 17 represents time accounting functions. Temporary help employees submit time records, which details time worked on specific jobs. Time Accounting 17 includes reconciling those time records with the information preserved from function block 16 and above. After these are reconciled, the information is stored in a separate file for that accounting period, and the all data collected thus far is preserved into function block 18.

Function block 18 represents generating payroll checks for temporary help employees. payroll checks are printed for the temporary help employees. These checks are based on data in the separate file generated in function block 17, and other data on the system. All data collected thus far is preserved into function block 19.

Function block 19 represents generating invoices for clients based on the amount of work performed for them during the accounting period and a billing rate. This data is preserved in the separate file generated in block 17, and on other date collected on the system. All data collected thus far is preserved into function block 20.

Finally, function block 20 represents reporting on trends and patterns. These trends and patterns are specified by input data and rules from the operator of the computer system. These data and rules are then applied to searches and sorts of the data preserves throughout the system to determine trends and patterns in the temporary help business's operation.

Each of these function blocks are described in expanded functional detail below.

Screen Employees

Figure 3:
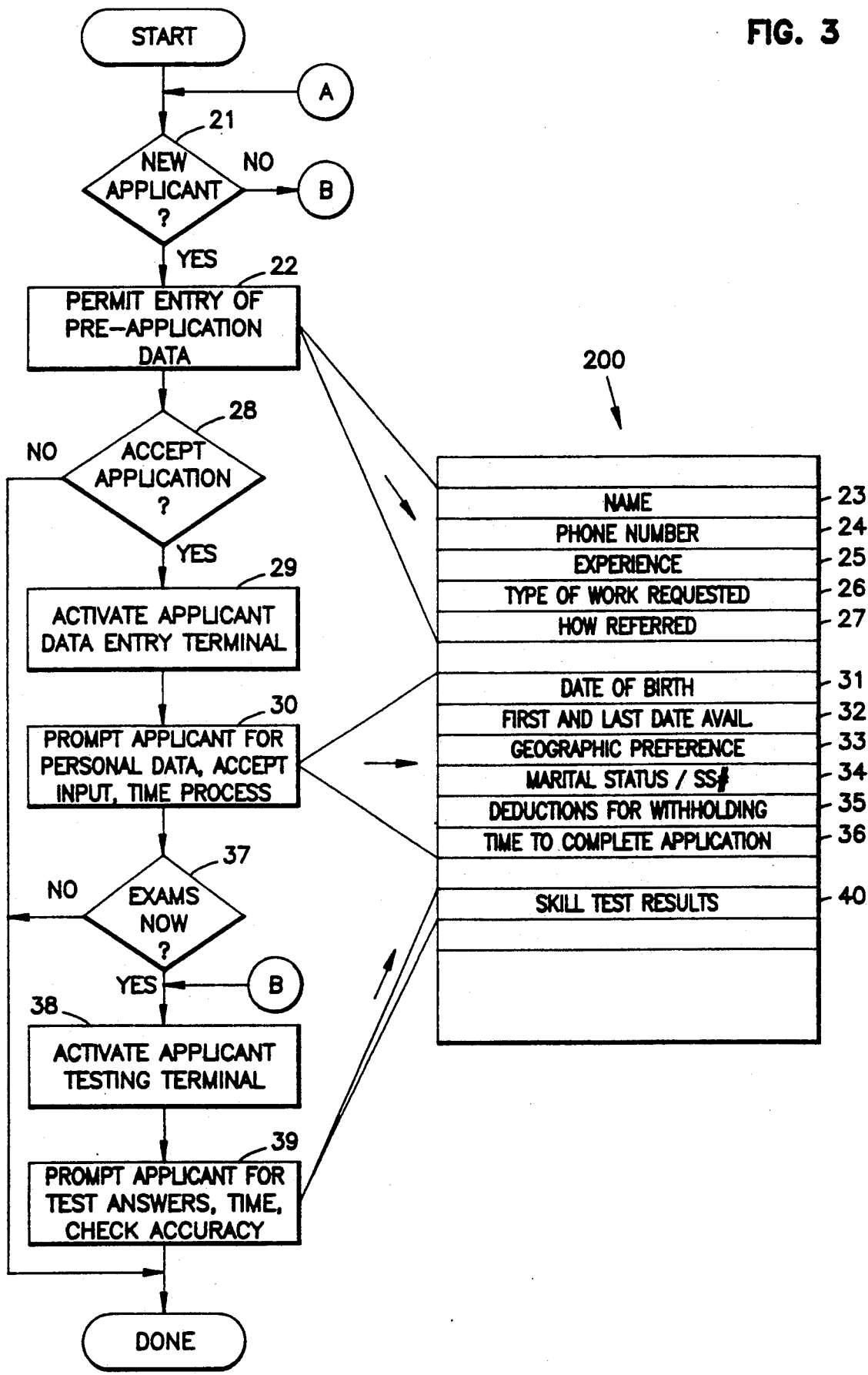
FIG. 3 and FIG. 3a together form a detailed block flow diagram of software component functions for screening and review of applicants for temporary help employee positions.

Referring now to FIG. 3, there is shown a diagrammatic representation of the Employee Inventory File 200 maintained in a storage device or memory in a computer system 11. This file is organized in records, each record representing an individual temporary help employee of the temporary help business. Each record is further broken into fields shown as individual blocks within the Employee Inventory File 200.

FIG. 3 represents a detailed block flow diagram of the software operable on computer system 11 which performs the functions represented by function block 12 of FIG. 2. The system begins with decision block 21 representing that the applicant can interrupt the application function at any time and return to it without loss of data. If the current applicant is a new applicant, the "Yes" branch of the decision block is met. In this case, the receptionist first enters pre-application data 22. This data includes a name 23, a phone number 24, the type of experience the person has had represented in textual format 25, the type of work the applicant is requesting represented in predefined numeric format 26, and how the applicant was referred to the temporary help business, also in predefined numeric format, 27. Based on the experience 25 and the type of work requested 26, the receptionist/operator determines whether the applicant should complete the application function. This is represented in decision block 28.

If it is determined that the applicant is not suited to temporary help work scheduled by the temporary help business, the negative branch of decision block 28 represents that the screening function is complete. If the applicant is accepted for further application, the affirmative branch represents that a work-station suited to entry of applicant information 3 of FIG. 1, is activated as represented in block 29. Function block 30 represents a series of steps wherein the applicant is prompted by the system for information found on employment applications commonly used in the industry. This information, entered at work-station 3, includes the date of birth of the applicant 31, a first and last date the applicant will be available for work 32, geographic preference for jobs 33, the applicant's marital status and social security number 34, and the deductions applicable to income tax withholding 35. Finally, the system records a numeric representation of the time required to complete the application 36 in the Employee Inventory File. This figure can be used later in reviewing the applicant's suitability for work to determine how well and how quickly the applicant follows instructions and understands how to operate a computer work-station.

Based on the time required to complete the application for this applicant, and the applicant's time and availability during the application function, the system determines whether to administer skill tests or defer them for a later time 37. If the applicant has taken too long to complete the application, or does not have time to presently take the skill tests, the negative branch of the decision represents terminating the screening process. If exams are to be administered, the affirmative branch of decision block 37 represents activating a testing work-station 4 of FIG. 1 for applicant skill testing 38.

Function block 39 represents a series of software controlled steps wherein the applicant is prompted for test answers at Applicant Testing workstation 4. Responses are timed, and the responses and timings are stored in the Employee Inventory File 200 maintained in computer system 11. The responses are compared to pre-determined correct responses stored in the system. From these comparisons, the system determines a numeric representation of employee skills. This is recorded in the Employee Inventory File 200.

Figure 3A:
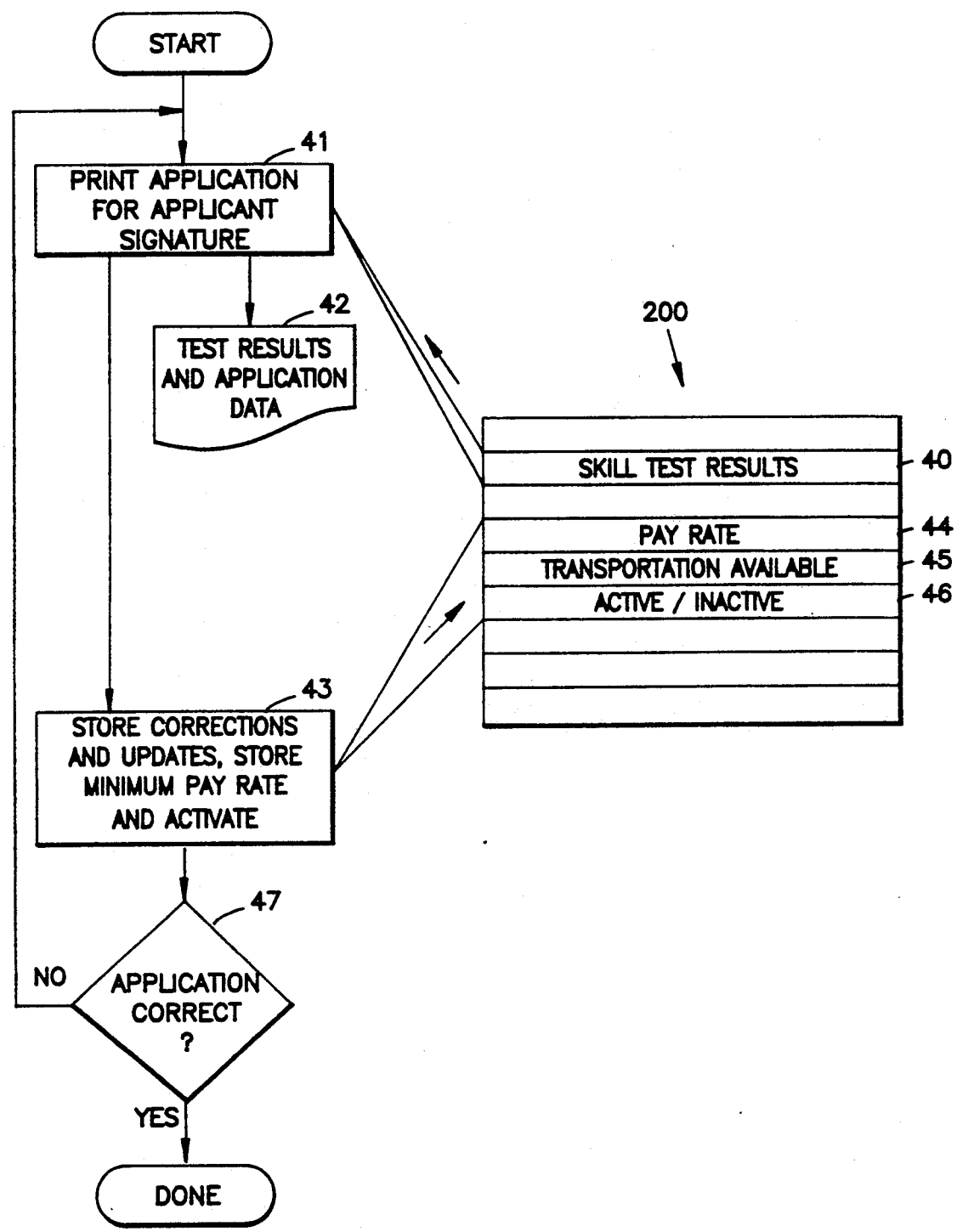

Referring now to FIG. 3a, the screening process is completed by reviewing information gathered during preceding steps and confirming its accuracy with the applicant. The software extracts from the Employee Inventory File 200 the skill test results obtained during the administration of skill tests 40, and prints them 41 in paper form 42. An operator of the Test Review work-station 5 of FIG. 1, then manually reviews skill test results with each applicant. The operator also reviews all the information input by the applicant during the application process for errors, and corrects them. This is represented in function block 43.

Function block 43 also represents assigning a pay rate 44 to the applicant, now a temporary help employee, based on the confirmed application information such as work experience and skill test results. Additional information, such as transportation available to the temporary employee 45, is entered into the Employee Inventory File 200. Finally, the record in the Employee Inventory File for the temporary help employee is marked "active" or "inactive" 46 based on the first and last available dates 32 of FIG. 3. The system then prompts the applicant for a final confirmation of all information on the temporary help employee represented in decision block 47. If it is correct, the screening and reviewing function is complete. Otherwise, the employee information is reviewed and corrected by an operator of the Test Review work-station 5 through software controlled prompts and responses.

Receive Job Orders

Figure 4:
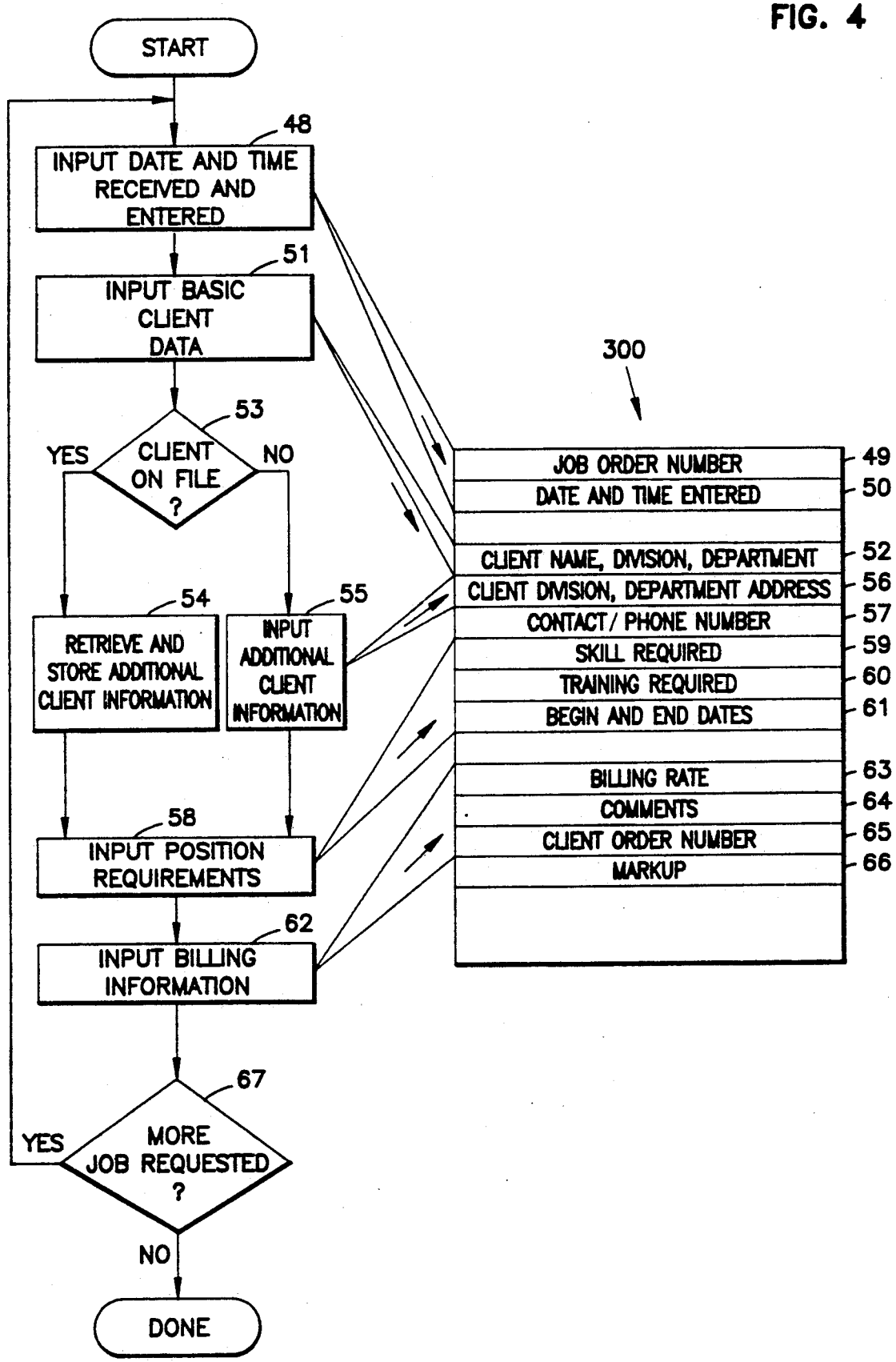
FIG. 4 is a detailed block flow diagram of software component functions for receiving temporary help job orders.

Referring now to FIG. 4, the Job Order File 300 is represented in pictorial form, and a detailed block flow diagram of entering job order information into it is presented. Job orders received, via telephone or otherwise, are recorded in the Job Order File 300 through the Job Order Receiving work-station 6 of FIG. 1. The Job Order File 300 is organized in job order records, each of which contains a number of specified fields. The specified fields include data such as a job order number, date and time entered.

FIG. 4 represents a detailed block flow diagram of the software operable on computer system 11 which performs the functions represented by function block 14 of FIG. 2. Function block 48 represents software for initializing a job order record. A unique job order number 49, and a date and time entered 50, and other pertinent information are stored into a job order record in the Job Order File 300. Next, basic client data is entered and retrieved in the system. This is represented in function block 51. The data entered includes client division and department name 52. The software system then searches other data retained on the digital computer not shown for additional client information. This search is represented by decision block 53. If additional client information is available on the digital computer system, not shown in the Figures, that information is retrieved and stored by the software into the Job Order File represented by function block 55. Otherwise, additional client information is input by the operator of the computer system 54 and stored by the software into the Job Order File 300. Examples of this data are the client division and department address 56, and a contact person 57 supervising the temporary job.

The software then prompts the operator 58 for requirements of the temporary job. One or more skills required for the temporary job 59, the training required 60, and the starting and ending dates of the temporary job 61 are stored by the software in the Job Order File 300. Next, the operator is prompted by the software 62 to enter billing information into the system. A billing rate 63, comments about the temporary job 64, a client order reference number 65, and the amount the bill is marked up 66 are all entered and stored by the software into the Job Order File 300.

Decision block 67 represents the cyclic nature of the job order receiving function. If there are additional job orders to be processed, the function repeats itself, otherwise the process is terminated.

Maintaining and Classifying Employees

Figure 5:
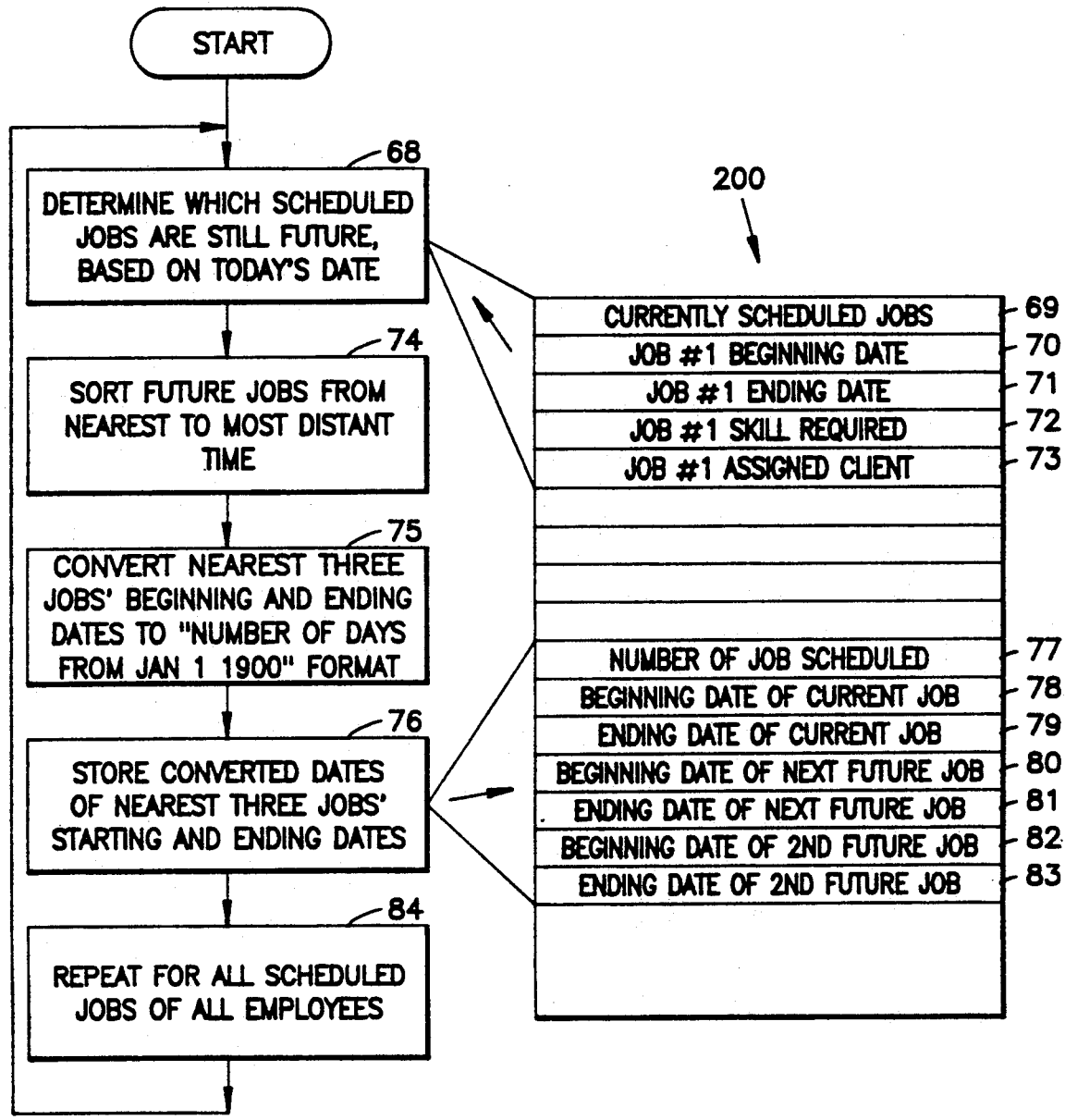
FIG. 5 is a detailed block diagram of software component functions for maintaining and classifying employees.

Referring now to FIG. 5, there it is shown that fields within the Employee Inventory File 200 updated whenever new data is entered into the file. Each employee record in the Employee Inventory File 200 contains fields for recording scheduled jobs. Each scheduled job has identical associated fields to "Job 1" as shown in FIG. 5: a beginning date 70, an ending date 71, a skill required 72, and an assigned client 73. The total number of "stacked jobs" or scheduled job fields representing future jobs, is also stored 69.

FIG. 5 represents a detailed block flow diagram of the software operable on computer system 11 which performs the functions represented by function block 13 of FIG. 2. Function block 68 represents the software examining, for each employee record in the Employee Inventory File 200, each of the jobs scheduled for each employee record. For each job scheduled, the beginning date 70 and the ending date 71 are compared to the beginning date and ending date of all other scheduled jobs for that employee.

The system software sorts 74 the beginning and ending dates from nearest to most distant time, and determines which are still future jobs based on the current system time and date. The system software then converts the values 75 of beginning and ending dates to a scaler value representing the number of days the beginning or ending date is after Jan. 1, 1900. The system then stores the scaler value representations of starting and ending dates of the next three future scheduled jobs 76.

The system software first determines the number of future jobs scheduled 77 for each employee record 69. It then stores, from the smallest to the largest starting date value (arithmetically larger than the similarly converted value of the current system date), the beginning date of current job 78, the ending date of the current job 79, the beginning 80 and ending 81 date of the next future job, and the beginning 82 and ending 83 date of the second future job. The software then repeats this function for all employee records in the Employee Inventory File 200 as represented by function block 84.

Filling Job Orders

Referring now to FIG. 6, there is shown a detailed block flow diagram of the software operable on computer system 11 which performs the functions represented by function block 15 of FIG. 2. Filling job orders is done by matching employee records in the Employee Inventory File 200 with job order records in the Job Order File 300. The system software compares 85 the beginning and ending dates for next future jobs (78, 79, 80, 81, 82, and 83) with the beginning and ending dates 61 of the job order record in the Job Order File 300. Then, the system software determines 86 whether the beginning and ending dates in a job order record fall between the beginning and ending dates of the jobs currently scheduled, known in the art as a "window" of time, for each employee record in the Employee Inventory File 200. If there is no match, alternatives are considered as described below for FIG. 6b.

If the employee record represents an employee who is available for work during the matching time "window," the system software then compares 87 the required job skill 59 with the recorded employee skills 40. Decision block 88 represents determining whether skills required match skills available. If there is no match, then alternatives are considered as described below for FIG. 6b.

If they match, the geographic location of the client is compared with the geographic preference 33 and the transportation available to the employee 45 for the employee record. If these match 90, according to predetermined criteria not shown, further matching is performed. If not, then alternatives are considered as described below for FIG. 6b.

Training requirements 60 and training information 94 are compared 91 in the Employee Inventory File 200, The system determines if these match 92. If the training requirements are not met by the current employee, then alternatives are considered as described below for FIG. 6b. Otherwise, the employee represented by the employee record currently under examination is a "candidate employee" suitable for assigning to the job specified by the job order record in the Job Order File 300. This is noted by the software in the Employee Inventory File 200 and the Job Order File 300 by storing pertinent information 93. The number of jobs currently scheduled for the employee 69 represented by the current employee record is incremented. The beginning date 70 and ending date 71 of the next scheduled job are filled with the beginning and ending dates 61 of the job specified in the Job Order File 300. The skill required 72 for that scheduled job in the Employee Inventory File 200 is filled with the information in the current job order record 59 of the Job Order File 300. Finally, the software stores the client division department name 52 to the assigned client field 73 for the scheduled order.

Referring now to FIG. 6a, which is a continuation of FIG. 6, the next step is manually contacting a candidate employee 100. To facilitate this, the system software displays client information 52 and the employee's phone number 24, and current job information 78 on the Job Order Filling work-station 7 of FIG. 1. The employee either accepts or rejects the position and the operator enters the response 101. If the job is accepted, the system software tests 103 for other unfilled jobs in the Job Order File 300. If there are none, the process is terminated. If there are unfilled outstanding job order records in the Job Order File 300, the next job order record is examined by the software 103.

If the candidate employee refuses the job, the software deletes 102 information entered thus far about the job. This includes deleting the employee name 95 and employee pay rate 96 for the first assigned employee record in the Job Order File 300. The software decrements the number of jobs scheduled 69 and deletes the beginning date of the previously scheduled job 70 in the Employee Inventory File 200. When an employee is contacted 100 and accepts a position, the employee is notified of its starting and ending dates and the assigned client. At this point, the employee is considered an "assigned employee" for the dates of that job.

Referring now to FIG. 6b, there is shown a detailed block flow diagram of system software functions for alternative matching criteria. If no suitable employee is found using the exact matching techniques discussed above, "near matching" techniques may be employed. The software prompts the operator of the workstation to determine if a near match should be attempted 158. If a near match is attempted, software prompts the operator to determine whether to search by near date or near skill 159.

To match by near date, only the ending dates (79,81,83) of the employee record are examined 160 by the system software. The software determines if the ending dates are within five business days of the starting date for the current job order. It then continues as before, by determining if the employee record is a match under this broader criteria 86 of FIG. 6.

To match by near skill, the software examines only a portion of the skill field in the Employee Inventory File 200. As noted in the detailed file formats below, and as represented in FIG. 6b, employee skills 40 are stored in two representations. First, there is a numeric representation of the general area of skill 162. For example, an employee might have word processing skills and this is represented by the number "400." Second, there is a specific textual representation of areas of skill expertise 163. For example, an employee may have expertise or experience on several specific word processing systems, and this may be represented as "WORDPERFECT." During an exact search described above, both parts of the skills field are examined for matching. Here, only the general area of skill is compared to the general area of skill required by the job order 161. The software also compares 164 the employee record to the required starting and ending dates for an exact match. The match is tested as before, for employee eligibility for a job 88 of FIG. 6.

Monitoring Jobs-In-Progress

Referring now to FIG. 7, once assigned employees begin performing temporary jobs for clients, an operator of the Jobs-In-Progress Monitoring work-station 8 of FIG. 1 contacts the employer to gather information 104. FIG. 7 represents a detailed block flow diagram of the software operable on computer system 11 which performs the functions represented by function block 16 of FIG. 2. To facilitate this contact, the software displays the job order number 49, the client name, division, and department 52, and a contact and phone number 57 on the Jobs-In-Progress Workstation 8 of FIG. 1.

The software accepts operator input data indicating whether the employee should be replaced in the temporary job 105. If the employee is to be replaced, function block 106 represents assigning an employee through a software method identical to the matching represented in FIG. 6 and 6a. The newly assigned employee, however, is recorded by the software in the next available assigned employee field based on the number of employees which have been assigned to this job order record. A new employee name 95 is assigned to the job order record, and an associated pay rate 96 is also assigned. The system software then updates billing rate 98 if necessary for that job record. This reflects variation in assigned employee pay rates, as an average of all pay rates assigned to the current job order record. The date and time when the new employee is scheduled is also recorded 99. Finally, the software fills a field representing the de-assigned employee unperformed hours 157 with the number of anticipated hours the deassigned employee who would have performed on the project based on the beginning and ending date 61 and the current system date.

The software permits the operator to modify starting or ending dates (109,110,61) based on client requests 107 to extend or shorten the period for the temporary position 108. Finally, client comments on the employee's performance are stored by the software in textual form 113 as represented by function block 111. The current system date is stored 114 in the Job Order File 300 to indicate when the client contact was made. This completes the monitoring process.

Decision block 115 indicates the cyclic nature of the monitoring process. All jobs are checked by the software serially until all jobs have been reviewed.

TIME ACCOUNTING

Figure 8:
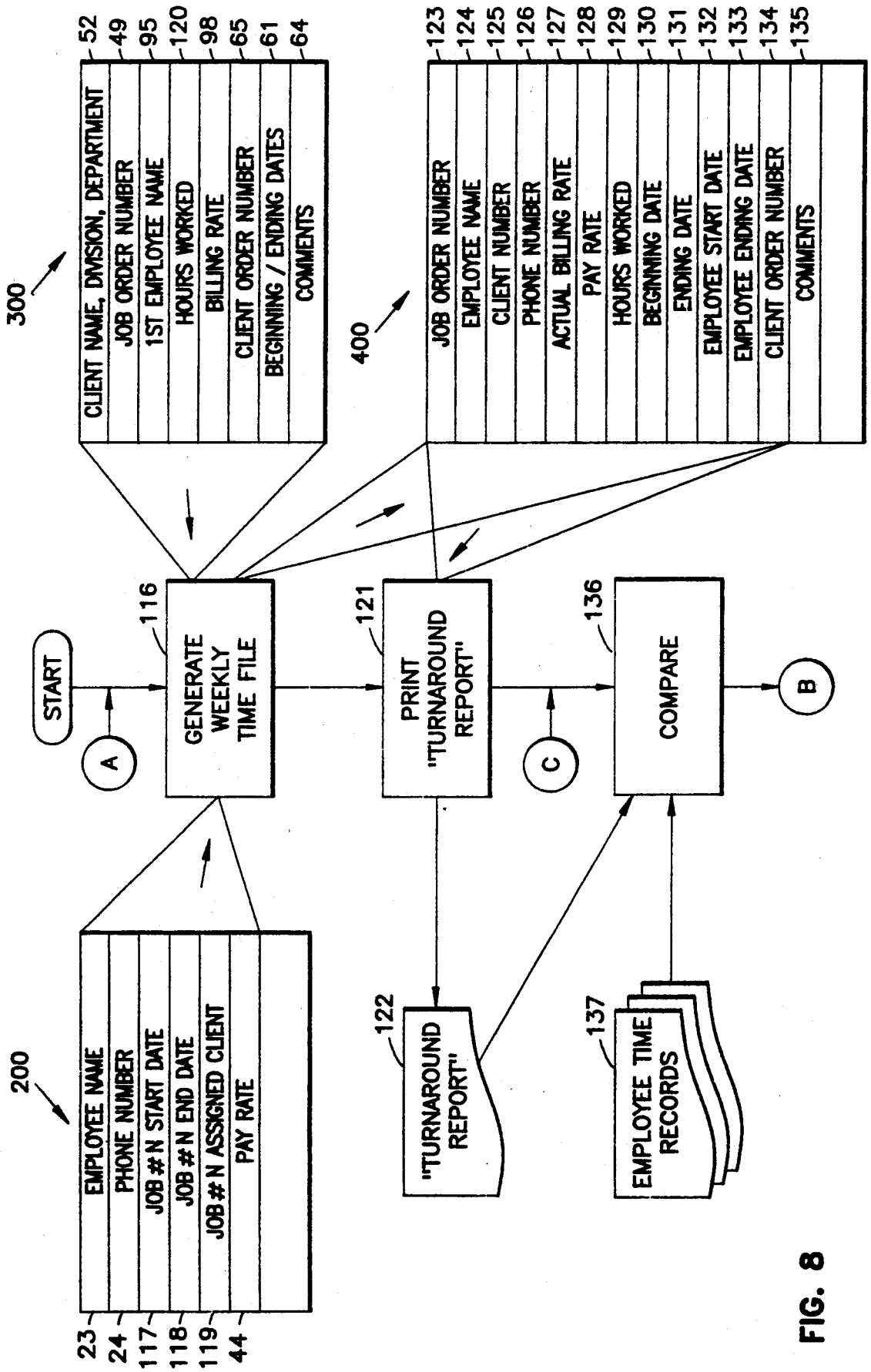
FIG. 8 and FIG. 8a together form a detailed block diagram of software component functions for time accounting functions within the system.

Referring now to FIG. 8, there is shown a detailed block flow diagram of the software operable on computer system 11 which performs time accounting functions represented by function block 17 of FIG. 2. Time accounting forms the basis for billing and payroll within the temporary help business. Data is collected and stored in a Periodic Time File 400. FIG. 8 represents Function block 116 shows that the Periodic Time File 400 is generated by relating data stored in the Job Order File 300 with data stored in the Employee Inventory File 200.

Specifically, the software extracts from the Employee Inventory File the employee name 23, phone number 24, and job information (job starting date 117, job ending date 118, assigned client 119, pay rate 44). The software also extracts from the Job Order File 300, the client name, division and department 52, and Job Order Number 49, together with employee information (employee name 95, hours worked 120, a billing rate 98) for each job order record. Additional job information is also collected including the client order reference number 65, the beginning and ending dates of the temporary position as entered 61, and comments 64.

The software relates and compares these fields according to predetermined rules not shown. It then stores them in the Periodic Time File 400. Fields include a job order number 123, employee name 124, client number 125, employee phone number 126, the actual billing rate 127, the pay rate 128, the hours worked 129, the beginning date 130, the ending date 131, the employee's starting date at the temporary position 132, and the employee ending date 133.

The identifying fields (client number 126, employee name 124, and job order number 123) are extracted directly from the Job Order File 300 and Employee Inventory File 200. The actual billing rate 127 is extracted directly from the Employee Inventory File 200. The hours worked 129 are extracted from the Job Order File 300 for the employee specified in the current record in the Periodic Time File 400. The beginning and ending date (130 and 131) are extracted directly from 61 from the Job Order File 300. Finally, the employee starting and employee ending date (132 and 133) as well as client order number 134 and comments 135 are extracted from the Job Order File 300 for the employee specified in the current record in the Periodic Time File 400.

The software prints 121 data in the Periodic Time File on paper 122 as a "Turn Around Report" according to predetermined rules not shown. This report is manually compared 136 to employee time records 137 submitted to the temporary help business by the temporary help employees. The employee time records 137 represent employee claims of time worked.

Figure 8A:
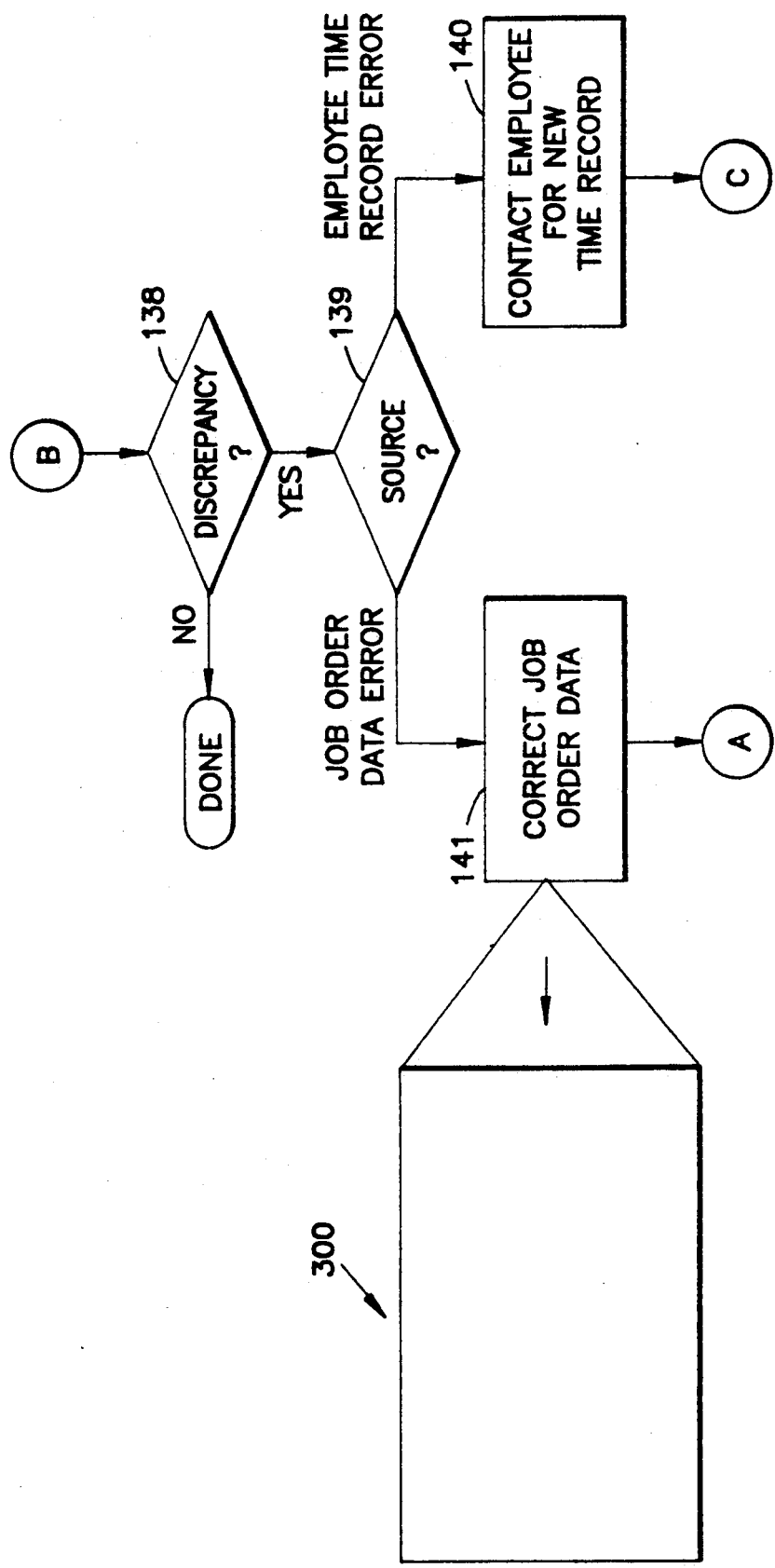

Referring now to FIG. 8a, discrepancies between the employee time records 137 and the "Turn Around Report" 122, are manually noted for modification 138. If there is a discrepancy between the two, the source of the problem is determined 139 by an operator of the Accounting workstation 9 of FIG. 1. If the employee time records are determined to be in error, the responsible employee is contacted and the record is corrected 140. The software displays the employee phone number 126 from the Periodic Time File 154 on the work-station 9 for this purpose. The system software then returns to comparing employee records at point "C". If the Job Order data is in error, then the software permits data in the Job Order File 300 to be modified by an operator of the Accounting work-station 9 of FIG. 1 assigned to correct job order data 141.

When there is no discrepancy between the employee time records 137 and the "Turn Around Report" 122, the process is terminated as represented by the negative branch of decision block 138.

Generating Payroll Checks

Figure 9:
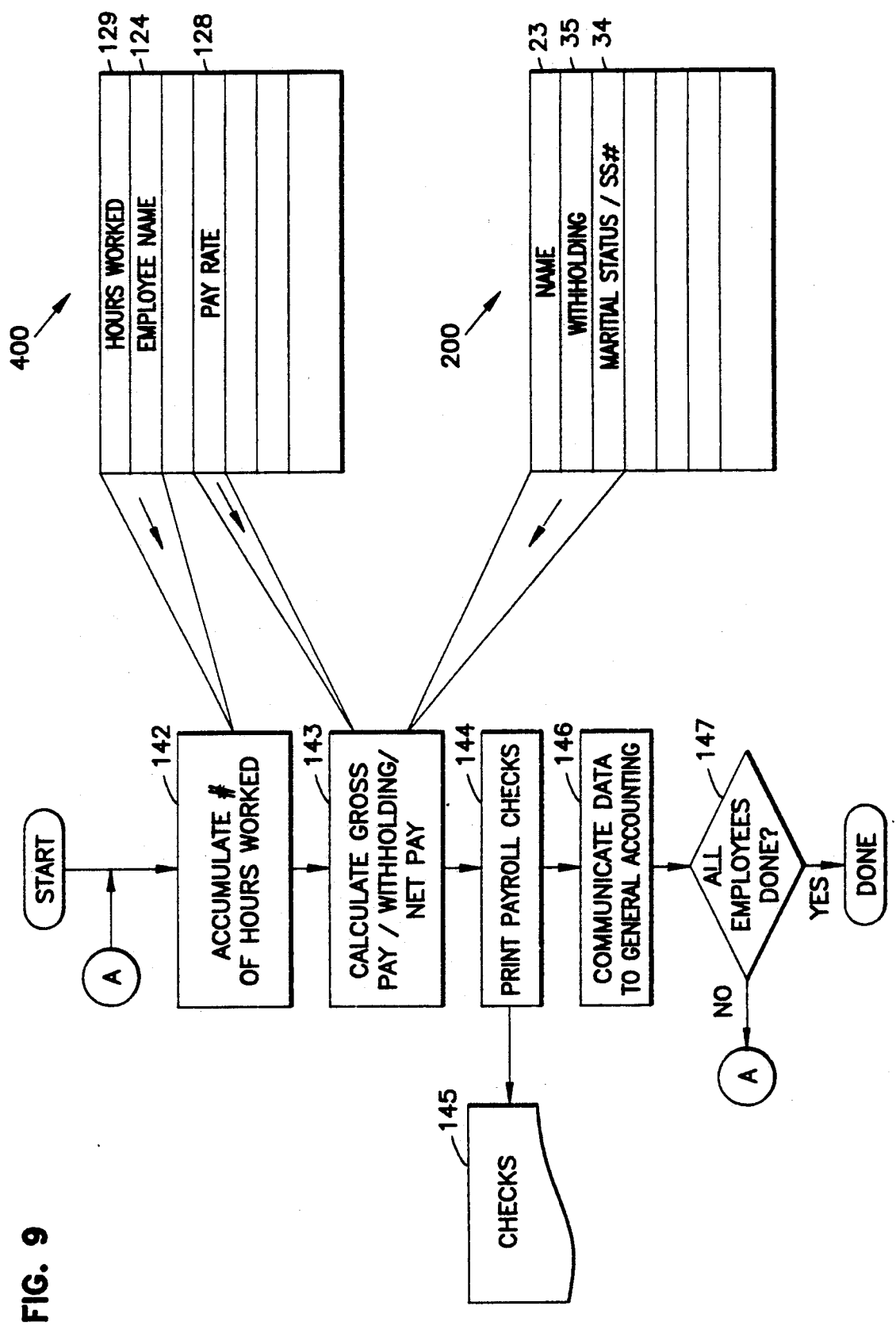
FIG. 9 is a detailed block diagram of software component functions for generating payroll checks within the system.

Referring now to FIG. 9, there is shown diagrammatically that based on the Period Time File 400, payroll checks are prepared for temporary help employees. FIG. 9 represents a detailed block flow diagram of the software operable on computer system 11 which performs the functions represented by function block 18 of FIG. 2. The software extracts data 142 from the Periodic Time File 400 for all employees who have worked for clients during the current accounting period. This data includes the employee name 124, and the hours worked on individual jobs by that employee 129. The software calculates employee pay based on each employee's pay-rate for each individual job performed 128, and payroll information in the Employee Inventory File 200. Payroll information includes the employee's name 23 for matching purposes, the employee's income tax withholding information 35, the marital status and social security number of the employee 34.

The system software makes a calculation, specified by predetermined rules not shown, based on the above data to determine the net pay due to each employee 143. The system software then prints 144 a payroll check 145 based on this net pay and employee data, and communicates 146 this information to a general accounting system not shown here through one or more media commonly known in the art. The process is repeated 147 for all employees who performed work during the current accounting period. Then the process is terminated.

Generating Billing Invoices

Figure 10:
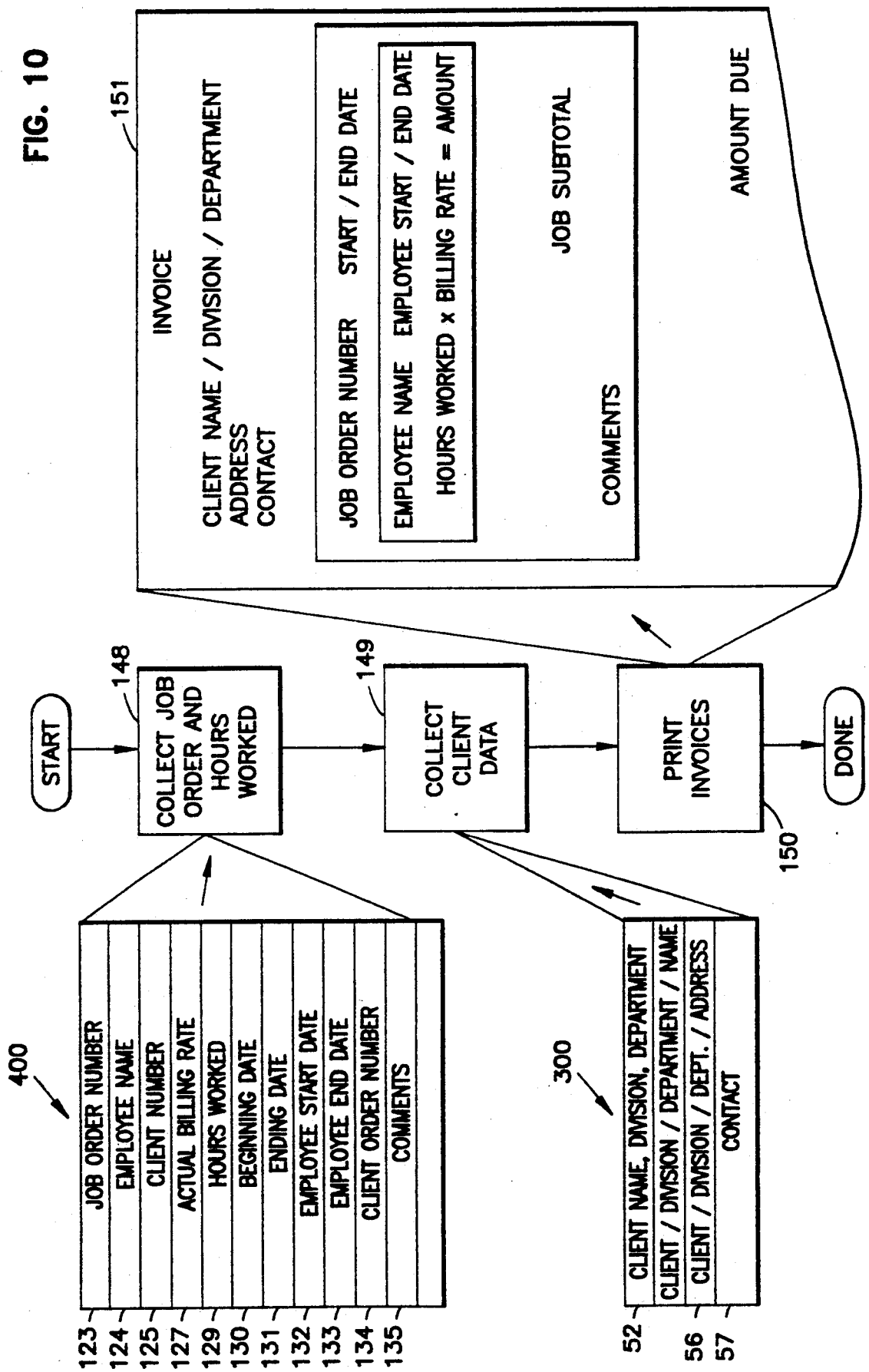
FIG. 10 is a detailed block diagram of software component functions for generating billing invoices within the system.

Referring now to FIG. 10, there is shown diagrammatically that billing invoices 151 are prepared for all clients based on information in the Period Time File 400 for each accounting time period. FIG. 10 represents a detailed block flow diagram of the software operable on computer system 11 which performs the functions represented by function block 19 of FIG. 2. The system software extracts 148 data from the Periodic Time File 400, including each job order number 123, each employee name for employees performing the job 124, the client number for the job 125, the billing rate 127, hours worked 129, the beginning 130 and ending 131 dates, the dates that each employee started 132 and ended 133 work on the job, a client order reference number 134, and comments about the job 135.

The system software then collects additional data from the Job Order File 300, and relates 149 it to the data collected above. The additional data includes: the client name, division, department 52 and client address 53 and contact 57. This data is then organized according to predetermined rules not shown and printed 150 onto paper as client billing invoices 151. Each invoice 151 indicates a client and address, and lists all jobs performed by employees assigned by the temporary help business to the client. For each job, all employees who performed the job are listed, together with their associated billing rate and hours worked. A subtotal of amount due from the client is shown for each employee and each job. A total amount due for the current accounting period, which is an accumulation of all subtotals above is also shown. When the entire Periodic Time File has been examined, the process is terminated 400.

Report Trends and Patterns

Figure 11:
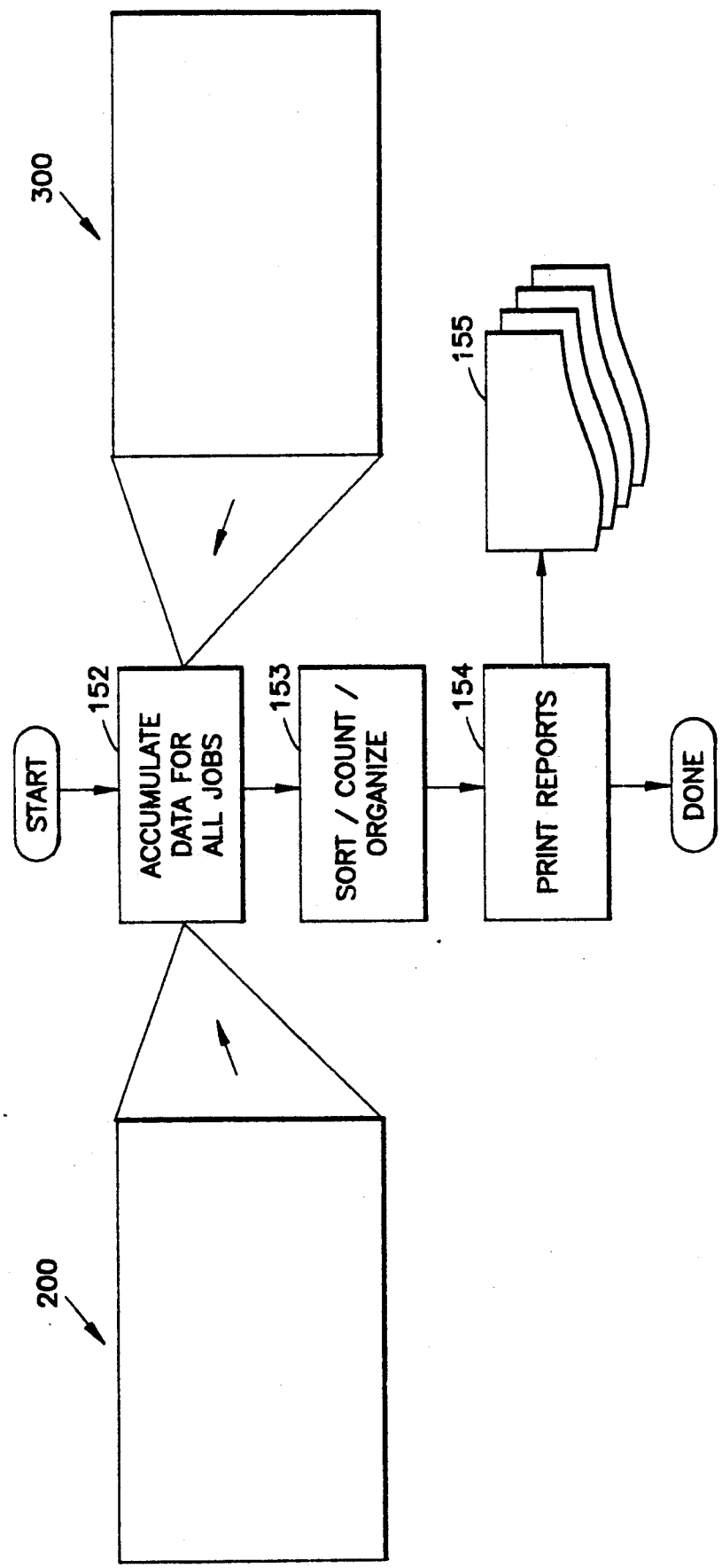
FIG. 11 is a high level block flow diagram of software component functions for reporting trends and patterns for the temporary help business.

Referring now to FIG. 11, there is shown diagrammatically the process of reporting trends and patterns. FIG. 11 is a detailed block flow diagram of the software operable on computer system 11 which performs the functions represented by function block 20 of FIG. 2. The system software reports trends and patterns in employee data and client order data according to predetermined reporting criteria not shown. The software extracts 152 data from the Job Order File 300 and Employee Inventory File 200. The software then organizes, sorts, and orders 153 the data according to the predetermined reporting criteria not shown. Finally, the sorted and organized data is printed 154 by the system onto paper reports 155.

Detailed Data Base File Formats

As is readily apparent to anyone skilled in the art, the information detailed above in the general description of the preferred embodiment could be maintained in a number of formats on many media. The detailed description of the preferred embodiment describes one method of storing and maintaining this data on a fixed rotational medium (disks) in a digital computer system. The detailed description of the three files described in the detailed description of the preferred embodiment follow hereinbelow.

Employee Inventory File Format 200 of FIG. 3

1. Personal Information
   a. Unique Employee Number
   b. Name
      i. First Name
      ii. Last Name
      iii. Middle Initial
   c. Address
      i. Street Address
      ii. City
      iii. State
      iv. Zip code
   d. Phone Number
   e. Date of Birth
   f. General Comments
2. Job Matching Information
   a. Active/Inactive
   b. Skill Types
      i. Skill #1, Textual Description
      ii. Skill #2, Textual Description
      iii. Skill #3, Textual Description
      iv. Skill #4, Textual Description
      v. Skill #5, Textual Description
   c. Proficiency
      i. Numeric Keypad Speed, relative to others
      ii. Typing Test Speed, relative to others
      iii. Clerical Skill Proficiency, relative to others
   d. Geographical Preference
   e. Times/Days Available
   f. Dates Already Scheduled
      i. Number of Currently Scheduled Jobs
      ii. Beginning Date of Current Job
      iii. Ending Date of Current Job
      iv. Beginning Date of Next Future Job
      v. Ending Date of Next Future Job
      vi. Beginning Date of 2nd Next Future Job
      vii. Ending Date of 2nd Next Future Job
   g. First Available Date
   h. Last Available Date
   h. Transportation Available
3. Jobs Currently Scheduled
   a. Job #1
      i. Beginning Date
      ii. Ending Date
      iii. Skill
      iv. Performance Review
      v. Assigned Client
   b. Job #2
      i. Beginning Date
      ii. Ending Date
      iii. Skill
      iv. Performance Review
      v. Assigned Client
      * * *
   t. Job #20
      i. Beginning Date
      ii. Ending Date
      iii. Skill
      iv. Performance Review
      v. Assigned Client
3. Payroll Information
   a. Tax Marital Status
   b. Number of Deductions
   c. Social Security Number
4. Training Information
   a. Training Hours
   b. Training Cost to Company

Job Order File Format 300 of FIG. 4

1. General Information
   a. Job Order Number
   b. Date Entered
   c. Time Entered
   d. Date Received
   e. Time Received
2. Client Information
   a. Client
      i. Name
      ii. Address
      iii. Contact(s)
      iv. Phone Number(s)
      v. Client Reference Number b. Division
      i. Name
      ii. Address
      iii. Contact(s)
      iv. Phone Number(s)
      v. Location
      vi. Hours
   c. Department
      i. Name
      ii. Address
      iii. Contact(s)
      iv. Phone Number(s)
      v. Location
      vi. Hours
3. Position Information
   a. Skill(s) Required
   b. Training Required
   c. As Soon As Possible
   b. Beginning Date
   c. Ending Date
4. Billing Information
   a. Low Billing Rate
   b. High Billing Rate
   c. Actual Billing Rate
   d. Markup
   e. Pay rate
   f. Gross Profit
   g. Start/End Dates of All Employees Filling Order
   h. Time Spent by All Employees Filling Order
   i. Pay rates of All Employees Filling Order
   g. Comments
   h. Client Order Number
5. Placement Information
   a. Date/Time Scheduled
   b. Filled By
   c. Time Unfilled Yet
   d. Date/Time Cancelled
   e. Reason Cancelled
   f. 1st Assigned Employee
      i. Employee Number
      ii. Pay rate
      iii. Performance Check
      iv. Date Performance Checked
      v. Replacement Requested
      vi. Pay Rate Adjustment Requested
      vii. Non-Billable Hours
      viii. Unperformed Hours
      ix. Performed Hours
   g. 2nd Assigned Employee
      i. Employee Number
      ii. Pay rate
      iii. Performance Check
      iv. Date Performance Checked
      v. Replacement Requested
      vi. Pay Rate Adjustment Requested
      vii. Non-Billable Hours
      viii. Unperformed Hours
      ix. Performed Hours
   * * *
   o. 10th Assigned Employee
      i. Employee Number
      ii. Pay rate
      iii. Performance Check
      iv. Date Performance Checked
      v. Replacement Requested
      vi. Pay Rate Adjustment Requested
      vii. Non-Billable Hours
      viii. Unperformed Hours
      ix. Performed Hours Periodic Time File Format 400 of FIG. 8

1. Job Information
   a. Job Order Number
   b. Starting Date
   c. Ending Date
   d. Billing Rate
   e. Client Number
   f. Client Name
2. Assigned Employee Information
   a. Social Security Number
   b. Employee Name
   c. Skill Requested
   d. Telephone Number
   e. Pay rate
   f. Starting Date
   g. Ending Date
3. Billing Information
   a. Discount Billing Rate
   b. Markup
   c. Gross Profit
   d. Hours Worked
   e. Week Ending

INTER-SYSTEM COMMUNICATION

Figure 12:
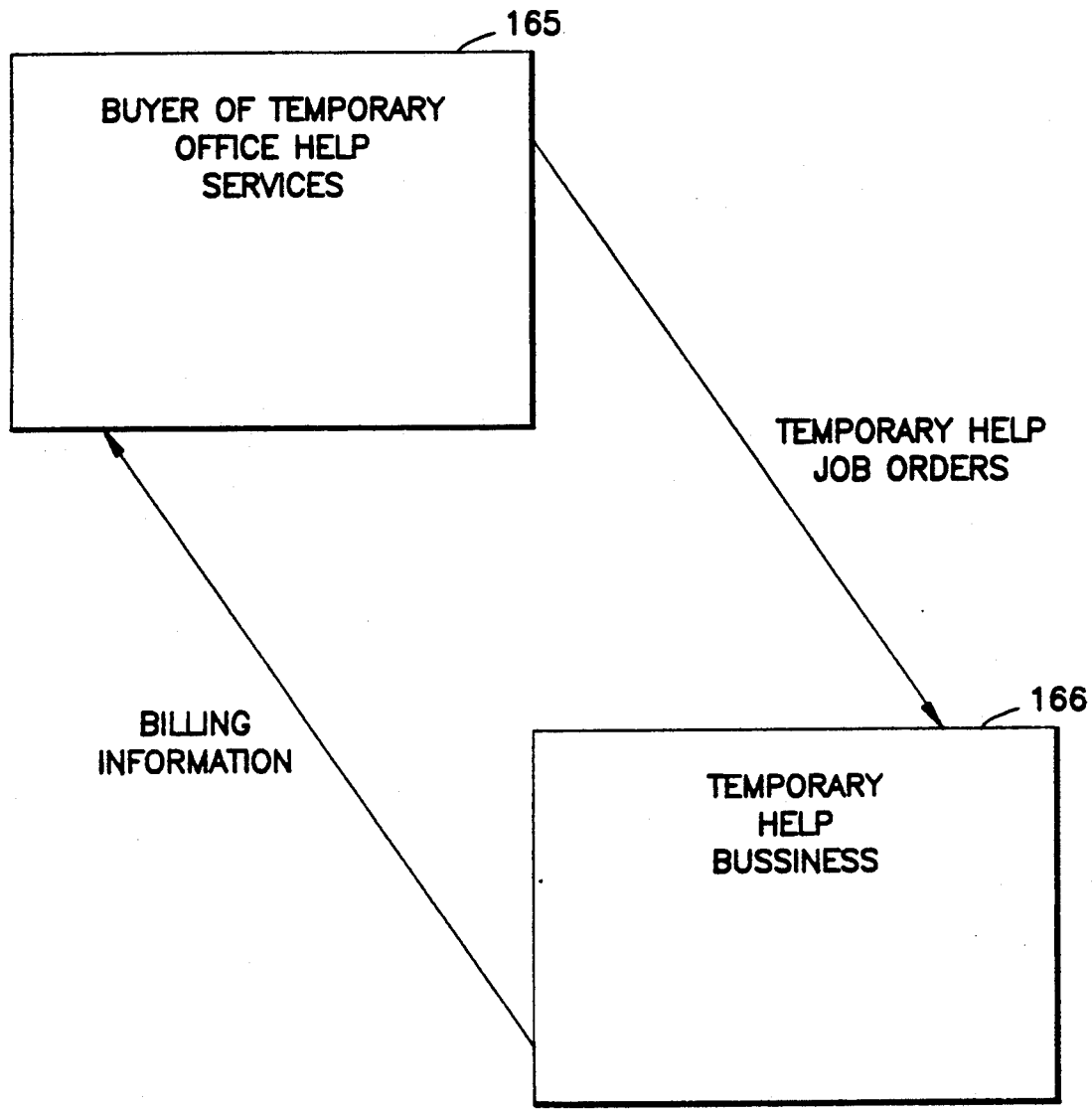
FIG. 12 is a high level block flow diagram of software component functions for system interaction between computer system used by a buyer of temporary help and a computer system used by a temporary help business.

Referring now to FIG. 12, there is shown diagrammatically how a buyer of temporary help, using a digital computer system 165, communicates temporary help job orders and billing information in a compatible format to a temporary help business digital computer system 166. Compatible format means that both digital computer systems have software means operable on them to generate and extract information in that format. For example, common database formats, predetermined on both systems is an example of a compatible format. The preferred format is a file organized in records identical in format to those in the Job Order File 300 of FIG. 4. This transmission is accomplished by way of a "common medium." A "common medium" is a hardware means operable on both digital computer systems to generate and extract binary data between the systems. Examples include flexible diskettes or modem equipment. The preferred "common medium" is either a flexible diskette which is physically transported between the systems or is a telecommunications link (208a) via which job order file is transferred between the systems.

Figure 13:
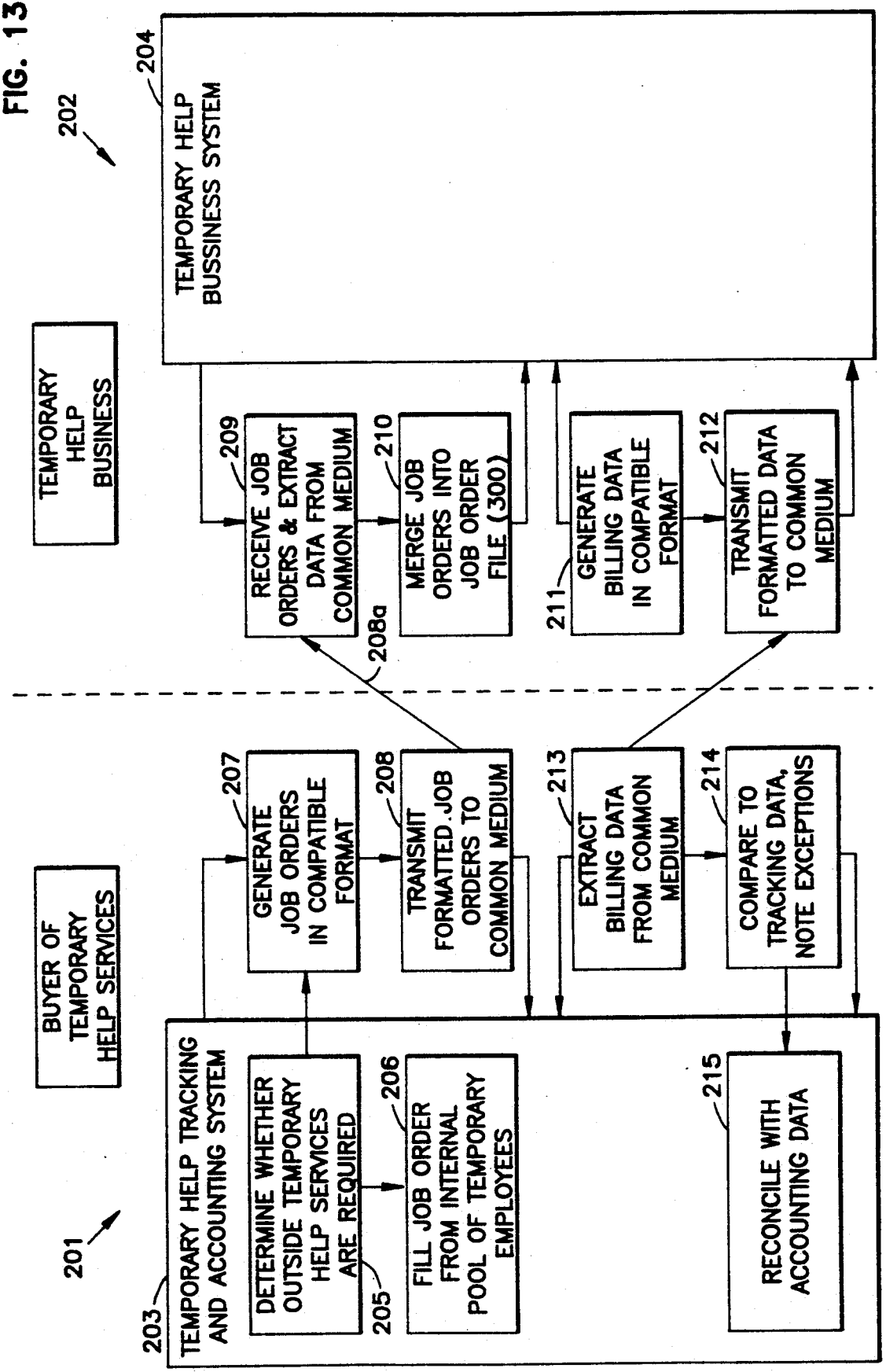
FIG. 13 is a medium level block flow diagram of software component functions for system interaction between a computer system used by a buyer of temporary help and computer system used by a temporary help business.

Referring now to FIG. 13, there is shown diagrammatically a computer system for tracking and accounting for temporary help services at a buyer of temporary help services communicating with a computer system in a temporary help businesses. FIG. 13 is a detail block flow diagram of the software operable on two computer systems (203,204).

The buyer of temporary help 201 is shown as proximately remote from the temporary help business 202. Both have computer systems: the buyer for tracking and accounting for temporary help usage 203, and the seller for matching and monitoring temporary help services supplied 204 as described above. The computer system in use by the buyer of temporary help services 203 determines through software 205 whether its company's temporary help services needs can be met from an internal pool of employees 206, or whether outside temporary help must be requested. If the buyer of temporary help services can satisfy its needs for temporary help, the software system records tracking information sufficient to track that request for temporary help 206. If, however, the internal pool of employees is insufficient, an outside request is made.

Generating an outside request includes generating one or more records representing a job order for temporary help services 207. This record is in compatible format, and in the preferred embodiment is in identical format to that of the Job Order File 300 of FIG. 4. The record has data identical to that of a record in the Job Order File 300 after receiving a job order 14 of FIG. 2, but before filling a job order 15 of FIG. 2. The software then transmits that record representing a job order through the common medium 208 to the temporary help business system. The job file is then received by the central computer 11 of FIG. 1, and the software operable on the computer extracts the records from the file (209). The software then merges 210 the record into the Job Order File 300 of FIG. 4 as an unfilled job order. The job order is then filled as above, beginning with function block 15 of FIG. 2.

At the conclusion of each accounting period, the software described above activates other software described hereinbelow by prompting the operator of the Accounting work-station 9 of FIG. 1 and accepting responses. The software activated generates billing data, comprised of all job order records in the Job Order File 300 of FIG. 4 which identify jobs for which temporary help services were supplied for the current accounting period 211. Billing data is in compatible format, which in the preferred embodiment is identical to a record in the Job Order File 300 of FIG. 4. The software then transmits the data through a common medium 212 to the computer system used by the buyer of temporary help services 203, and software means operable on the system is activated. This software means extracts the data 213 and compares the data 214 in compatible format to data within the tracking and accounting system used by the buyer of temporary help 203. The software notes and reports exceptions between the two data not shown. The system then reconciles 215 the data with the accounting system used by the buyer of temporary help services not shown.

Although the specific logic and hardware configurations have been illustrated and described for the preferred embodiment of the present invention set forth herein, it would be appreciated by those with ordinary skill in the art that any conventional logic and hardware arrangements which are calculated to achieve the same purpose may be substituted for the specific configuration shown. Thus, although the preferred embodiment of the present invention is described in terms of a relational data base management system, the same invention could be practiced using any conventional programming language available for digital computing systems. In addition, it would be readily appreciated by those of ordinary skill in the art that although individual files and file formats are used to organize the data in the preferred embodiment of the present invention, any technique to store and retrieve such data in an organized fashion on a fixed digital storage medium would not depart from the present invention. Finally, although the preferred embodiment of the present invention is set forth in terms of the central computer and dedicated work-stations, a change to general purpose workstations or a distributed processing environment could be made without departing from the present invention as would be readily appreciated by those skilled in the art. For example, personal computer work-stations could be substituted for dedicated interactive video display workstations in the preferred embodiment without departing from the present invention.

While the present invention is described in connection with the preferred embodiment thereof, it will be understood that many modifications will be readily apparent to those of ordinary skill in the art, and this application is intended to cover any adaptations or variations thereof. Therefore it is manifestly intended that this invention be limited only by the claims and the equivalents thereof.

What is claimed is:

1. A system for use in temporary help businesses for screening temporary help employees, testing said temporary help employees for one or more employee skills, recording a time that said temporary help employees are available to perform temporary jobs, receiving and recording job orders from one or more clients requesting temporary help personnel with one or more specified required skills to perform temporary jobs, assigning said temporary help employees to said temporary jobs, recording client comments about said temporary help employees, determining an amount of money due to said temporary help employees for specified periods of time, determining an amount of money due from said clients for temporary help services performed by said temporary help employees for specified periods of time, and reporting trends and patterns of said job orders and temporary help employees applications based on specified input criteria, comprising:

a digital computer;

one or more screening terminals, wherein said screening terminals are interactive video display terminals operable on said computer to cause software means responsive to an operator of said screening terminal to
  a. enter, for each applicant for temporary work, pre-application information;
  b. activate, for each said applicant which will be considered for temporary work, an applicant information terminal;

one or more said applicant information terminals, wherein said applicant information terminals are interactive video display terminals operable on said computer to cause software means operable on said computer to be responsive to
  a. enter, applicant personnel information;
  b. an address, a phone number, and a date of birth,
  c. a geographic area where said applicant prefers to work,
  d. text describing employment experience,
  e. a quantity representing said length of work experience,
  f. a first available data and a last available date, between which said applicant will perform said temporary jobs,
  g. days of the week and times of the day when said applicant will not perform said temporary jobs,
  h. whether said applicant has personal transportation available, and
  i. data by which income tax withholding from pay should be calculated;

means for determining a statistically based predictor of work site success representing the applicant's general proficiency with said computer terminal, based on the time required by the applicant to enter said pre-application information;

one or more applicant testing terminals, wherein said applicant testing terminals are interactive video display terminals operable on said computer to cause software means operable on said computer to:
  a. display test instructions to said applicant,
  b. display a test problem requiring an exact answer, a timed response, or both,
  c. accept manual entry of a proposed solution to said test problem,
  d. repeat said steps until all test problems required for a particular applicant have been displayed,
  e. determine, based on said proposed solutions to said test problems, scores representing proficiency in said one or more employee skills, and
  f. determine a statistically based predictor of work site success representing applicant's general proficiency with said computer terminal in relation to other applicants, based on said test scores and the time required by the applicant to respond to the inquiries presented by said applicant information terminal;

one or more test review terminals, wherein said test review terminals are interactive video display terminals operable on said computer to cause software means operable on said computer to:
  a. display said statistically based predictor for each applicant,
  b. respond to operator input of character representations of specified employee skills,
  c. respond to operator input of said test review terminal to permit modification of any data recorded for said applicant,
  d. permit entry of a minimum pay rate for said applicant, and
  e. permit entry of an activation value which specifies that said applicant is an active temporary help employee;

one or more job order entry terminals, wherein said job order entry terminals are interactive video display terminals operable on said computer to cause software means operable on said computer to:
  a. respond to operator input to enter, for each said job order, information about a specified temporary job including:
    i. a client name, address, division, department, contact person, and phone number,
    ii. a unique job order number, a date and time when said job order is entered,
    iii. one or more required skills for said temporary job,
    iv. a starting and ending time for said temporary job, and
    v. a billing rate for said client for said temporary job;
  b. determine, for each temporary job order, one or more temporary help employees who are candidates to perform said temporary job by:
    i. determining which of said one or more temporary help employees will accept a job and are not already scheduled in a job for the time between said starting and ending times for said temporary job, wherein said employees are matching employees,
    ii. determining which of said matching employees have skills and pay rates which match said required skills and pay rate for said temporary job, wherein such employees are candidate employees, and
  c. determining which said candidate employee to assign to said temporary job order by:
    i. displaying said candidate employees and their phone numbers, and
    ii. accepting a confirmation from said salesperson of which candidate employee is assigned to said temporary job;

one or more job monitoring terminals, wherein said job monitoring terminals are interactive video display terminals operable on said computer to cause software means operable on said computer to:
  a. be responsive to operator input in accepting data which represents client requests to:
    i. replace said assigned employee,
    ii. shorten the length of time required to perform said temporary job,
    iii. extend the length of time required to perform said temporary job,
    iv. store comments on said assigned employee;

one or more accounting terminals, wherein said accounting terminals are interactive video display terminals operable on said computer to cause software means operable on said computer to:
  a. display, for a specified accounting period, a time worked for all jobs performed during said specified accounting period by employees which performed said jobs,
  b. respond to operator input to modify said time worked, and
  c. print, on said one or more printers, payroll checks for said employees and invoices for said clients based on said time records;

one or more planners terminals, wherein said planner terminals are interactive video display terminals operable on said computer to cause software means operable on said computer to sort, calculate and print data based on specified input criteria.

2. A system for use in a temporary help business which assigns temporary help employees to job orders by matching, for each said job order, the skills required for a job and a quantity of time required to perform said job order with the skills and availability of said employees, comprising:
  (1) a temporary help business computer system;
  (2) said computer system maintaining Employee Inventory Records representing said employees and a schedule of job orders assigned to said employees;
  (3) said computer system maintaining Job Order Records representing said job orders and a schedule of when said job orders are to be performed;
  (4) said computer system including job assignment means for:
    (i) comparing required job skills stored in the Job Order Record with employee skills stored in the Employee Inventory Record and matching employees with job orders;
    (ii) near matching employees when the job skills requirements do not match; and
    (iii) searching the Employee Inventory Records for windows of availability in the schedules of said matched and near matched employees by determining whether the beginning and ending dates in the Job Order Record fall between the beginning and ending dates for the job currently scheduled for the matched and near matched employees in the Employee Inventory Record, and assigning an employee to said job order when said job window and said employee scheduling window correspond, whereby said job orders and stacked;

(5) a client computer system at a client location and means for communicating with said temporary help business computer system;

(6) said client computer system further comprising:
- (i) client job order management means for communicating job orders in the form of job order records to the temporary help business computer system;
- (ii) means for receiving near matches from said temporary help business computer system; and
- (iii) means for allowing client personnel to review the Employee Inventory Record of near matched employees and identify satisfactory near matches and for communicating said satisfactory near match to said temporary help business computer system, whereby client is provided the greatest flexibility in the selection of temporary employee.

3. The system of claim 2, wherein said job assignment means further comprise:
- (1) means for comparing a geographic location in the Job Order Record with a geographic preference and a transportation availability in the Employee Inventory Record; and
- (2) means for comparing training requirements in the Job Order Record with employee training in the Employee Inventory Record.

4. The system of claim 2, wherein the job assignment means further comprises means for near matching when the geographic location or training requirements do not match.

5. The system of claim 2, wherein the job assignment means for near matching further comprises means for determining when the ending dates in the Employee Inventory Record are within a pre-determined interval of the starting date in the Job Order Record.

6. The system of claim 2, wherein the job assignment means for near matching further comprises means for comparing only the general area of the employee skills in the Employee Inventory Record with the general area of required job skills in the Job Order Record.

7. The system of claim 2, wherein the job assignment means are capable of executing the steps of:
- (a) determining if the beginning and ending dates in a Job Order Record fall between the beginning and ending dates of the jobs currently scheduled for the Employee Inventory Record;
- (b) retrieving the next Employee Inventory Record when there is no match, and returning to step (a);
- (c) determining if the skills required in the Job Order Record match the employee skills in the Employee Inventory Record;
- (d) retrieving the next Employee Inventory Record when there is no match, and returning to step (a);
- (e) determining if the geographic location in the Job Order Record matches the geographic preference and the transportation availability in the Employee Inventory Record;
- (f) retrieving the next Employee Inventory Record when there is no match, and returning to step (a);
- (g) determining if the training requirements in the Job Order Record match the employee training in the Employee Inventory Record;
- (h) retrieving the next Employee Inventory Record when there is no match, and returning to step (a);
- (i) assigning the job specified by the Job Order Record to the Employee Inventory Record, incrementing the number of jobs currently scheduled for the Employee Inventory Record, filling the beginning date and ending date of the next scheduled job in the Employee Inventory Record with the beginning and ending dates of the job specified in the Job Order Record, filling the skill required for that scheduled job in the Employee Inventory Record with the skills required from the Job Order Record, and filling the assigned client for the scheduled job in the Employee Inventory Record with the client division department name in the Job Order Record;
- (j) displaying the client information, employee phone number, and current job information on the computer so that the employee may be contacted;
- (k) deleting the assignment information in the Employee Inventory and Job Order Records when the job is refused, retrieving the next Employee Inventory Record, and returning to step (a); and
- (l) retrieving the next Job Order Record when the job is accepted, and returning to step (a) as long as more Job Order Records exist.

8. The system of claim 2, wherein said client job order management means includes means for entering, for each said job order, information about a specified temporary job including a client name, address, division, department, contact person, and phone number, a unique job order number, a date and time when said job order is entered, at least one required skills for said temporary job, a starting and ending time for said temporary job, and a billing rate for said client for said temporary job;

9. The system of claim 2, wherein the client job order management means comprise means for accepting client requests to replace said assigned employee, shorten the length of time required to perform said temporary job, extend the length of time required to perform said temporary job, and store comments on said assigned employee, whereby the changes will be reflected in all subsequent near matches.

10. The system of claim 2, wherein said job assignment means further comprises ranking said temporary help employees on their proficiency with a computer terminal as determined by the time required by the applicant to enter pre-application information.

11. The system of claim 2, wherein said job assignment means further comprises means for ranking said temporary help employees based their performance on proficiency tests.

12. A system for use in a temporary help business which assigns temporary help employees to job orders by matching, for each said job order, the skills required for a job and a quantity of time required to perform said job order with the availability of said employees, comprising:
- (1) a temporary help business computer system;
- (2) said computer system maintaining Employee Inventory Records representing said employees and a schedule of job orders assigned to said employees;
- (3) said computer system maintaining Job Order Records representing said job orders and a schedule of when said job orders are to be performed;
- (4) said computer system including job assignment means for:

(i) comparing required job skills stored in the Job Order Record with employee skills stored in the Employee Inventory Record and matching employees with job orders;
(ii) searching the Employee Inventory Records for windows of availability in the schedules of said matched and near matched employees by determining whether the beginning and ending dates in the Job Order Record fall between the beginning and ending dates for the job currently scheduled for the matched and near matched employees in the Employee Inventory Record, and assigning an employee to said job order when said job window and said employee scheduling window correspond; and
(iii) near matching employees to said job orders when said job window and said employee scheduling window do not match, whereby said job orders are stacked;
(5) a client computer system at a client location and means for communicating with said temporary help business computer system;
(6) said client computer system further comprising:
(i) client job order management means for communicating job orders in the form of job order records to the temporary help business computer system;
(ii) means for receiving near matches from said temporary help business computer system; and
(iii) means for allowing client personnel to review the Employee Inventory Record of near matched employees and identify satisfactory near matches and for communicating said satisfactory near match to said temporary help business computer system, whereby client is provided the greatest flexibility in the selection of temporary employee.

13. The system of claim 12, further including:

(1) a client computer system at a client location and means for communicating with the temporary help business computer system;
(2) said computer system further comprised of client job order management means for communicating job orders in the form of job order records to the temporary help business computer system;
(3) said temporary help business computer system including means for communicating near matches to the client computer system; and
(4) said client computer system including means for allowing client personnel to review the Employee Inventory Record of near matched employees and identify satisfactory near matches and for communicating said satisfactory near match to the temporary help business computer system, whereby client is provided the greatest flexibility in the selection of temporary employee.

14. A system for use in a temporary help business which assigns temporary help employees to job orders by matching, for each said job order, the skills required for a job and a quantity of time required to perform said job order with the skills and availability of said employees, comprising:
(1) a temporary help business computer system;
(2) said computer system maintaining Employee Inventory Records representing said employees and a schedule of job orders assigned to said employees;
(3) said computer system maintaining Job Order Records representing said job orders and a schedule of when said job orders are to be performed;
(4) a client computer system at a client location and means for communicating with said temporary help business computer system, wherein said client computer system further comprising means for allowing client personnel to review the Employee Inventory Record for matched or near matched employees and identify satisfactory match, and for communicating said satisfactory match to said temporary help business computer system, whereby client is provided the greatest flexibility in the selection of temporary employee.

* * * * *

UNITED STATES PATENT AND TRADEMARK OFFICE
CERTIFICATE OF CORRECTION

PATENT NO. : 5,117,353
DATED : May 26, 1992
INVENTOR(S) : Stipanovich, et al.

It is certified that error appears in the above-identified patent and that said Letters Patent is hereby corrected as shown below:

In Column 5, line 43, delete "the all" and insert therein --all the--.

In Column 5, line 46, before "payroll" insert therein --the--.

In Column 12, line 19, delete "154" and insert therein --400--.

In Column 14, line 26, delete "h." and insert therein --i.--.

In Column 21, line 4, delete "and" and insert therein --are--.

In Column 23, line 11, delete "job" and insert therein --jobs--.

Signed and Sealed this

Thirty-first Day of August, 1993

Attest:

BRUCE LEHMAN

Attesting Officer

Commissioner of Patents and Trademarks